(12) United States Patent
Kang et al.

(10) Patent No.: US 12,177,712 B2
(45) Date of Patent: Dec. 24, 2024

(54) METHOD AND APPARATUS FOR CONTENT TRANSMISSION USING A TERMINAL STORAGE DEVICE IN A WIRELESS COMMUNICATION SYSTEM

(71) Applicant: Korea University Research and Business Foundation, Seoul (KR)

(72) Inventors: Chunggu Kang, Seoul (KR); Junman Lee, Seoul (KR); Sanghyun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 225 days.

(21) Appl. No.: 17/785,515

(22) PCT Filed: Dec. 16, 2020

(86) PCT No.: PCT/KR2020/018487
§ 371 (c)(1),
(2) Date: Jun. 15, 2022

(87) PCT Pub. No.: WO2021/125809
PCT Pub. Date: Jun. 24, 2021

(65) Prior Publication Data
US 2023/0051319 A1 Feb. 16, 2023

(30) Foreign Application Priority Data
Dec. 16, 2019 (KR) ........................ 10-2019-0168197

(51) Int. Cl.
*H04W 28/02* (2009.01)
*H04L 65/40* (2022.01)
(Continued)

(52) U.S. Cl.
CPC ......... *H04W 28/0226* (2013.01); *H04L 65/40* (2013.01); *H04L 67/568* (2022.05);
(Continued)

(58) Field of Classification Search
CPC ... H04W 28/14; H04W 36/32; H04W 36/023; H04W 4/02; H04W 40/02;
(Continued)

(56) References Cited

U.S. PATENT DOCUMENTS

2012/0102140 A1\* 4/2012 Nadas ................. H04L 43/0888
709/213
2012/0165036 A1 6/2012 Shook et al.
(Continued)

FOREIGN PATENT DOCUMENTS

CN 101772975 A \* 7/2010 ............ H04W 99/00
CN 101127956 B \* 4/2011
(Continued)

*Primary Examiner* — Dung Hong
(74) *Attorney, Agent, or Firm* — NSIP Law

(57) ABSTRACT

This disclosure relates to the 5th generation (5G) or pre-5G communication system for supporting a higher data rate after the 4th generation (4G) communication system such as Long Term Evolution (LTE). The method for operating the core network in a wireless communication system according to this disclosure comprises the processes of determining the content to store in the terminal based on the location information of the terminal, transmitting the content transmission command to the base station so as to transmit the content to the terminal in response to the determination, checking whether the terminal has entered the overload cell, and forming a D2D communication link between the terminal and another adjacent terminal when it is identified that the terminal has entered the overload cell.

12 Claims, 34 Drawing Sheets

(51) Int. Cl.
  *H04L 67/568* (2022.01)
  *H04W 28/14* (2009.01)
  *H04W 76/14* (2018.01)
  *H04W 88/18* (2009.01)

(52) U.S. Cl.
  CPC ....... *H04W 28/0284* (2013.01); *H04W 28/14* (2013.01); *H04W 76/14* (2018.02); *H04W 88/18* (2013.01)

(58) Field of Classification Search
  CPC ............. H04W 28/0226; H04W 76/14; H04W 28/0284; H04W 88/18; H04L 67/568; H04L 65/40
  See application file for complete search history.

(56) References Cited

U.S. PATENT DOCUMENTS

| | | | | |
|---|---|---|---|---|
| 2012/0250657 A1* | 10/2012 | Zhou | ................ | H04W 36/0038 370/331 |
| 2014/0254557 A1* | 9/2014 | Lim | .................. | H04W 36/0064 370/331 |
| 2014/0348081 A1* | 11/2014 | Liao | ........................ | H04L 67/51 370/329 |
| 2015/0105082 A1* | 4/2015 | Cheng | ................ | H04W 36/033 455/436 |
| 2016/0323365 A1 | 11/2016 | Wu | | |
| 2018/0132063 A1* | 5/2018 | Wang | ...................... | H04L 67/52 |
| 2019/0281498 A1* | 9/2019 | Lubenski | ............... | H04W 76/11 |
| 2020/0366725 A1* | 11/2020 | Skog | ..................... | H04L 67/568 |

FOREIGN PATENT DOCUMENTS

| | | | | | |
|---|---|---|---|---|---|
| EP | | 3043581 A1 | * | 7/2016 | ............ H04W 76/11 |
| GB | | 2458102 A | * | 9/2009 | ............ H04W 12/02 |
| KR | 10-2017-0103255 A | | | 9/2017 | |
| WO | WO-2013002916 A1 | | * | 1/2013 | ......... H04L 67/2852 |

* cited by examiner

[Fig. 1]
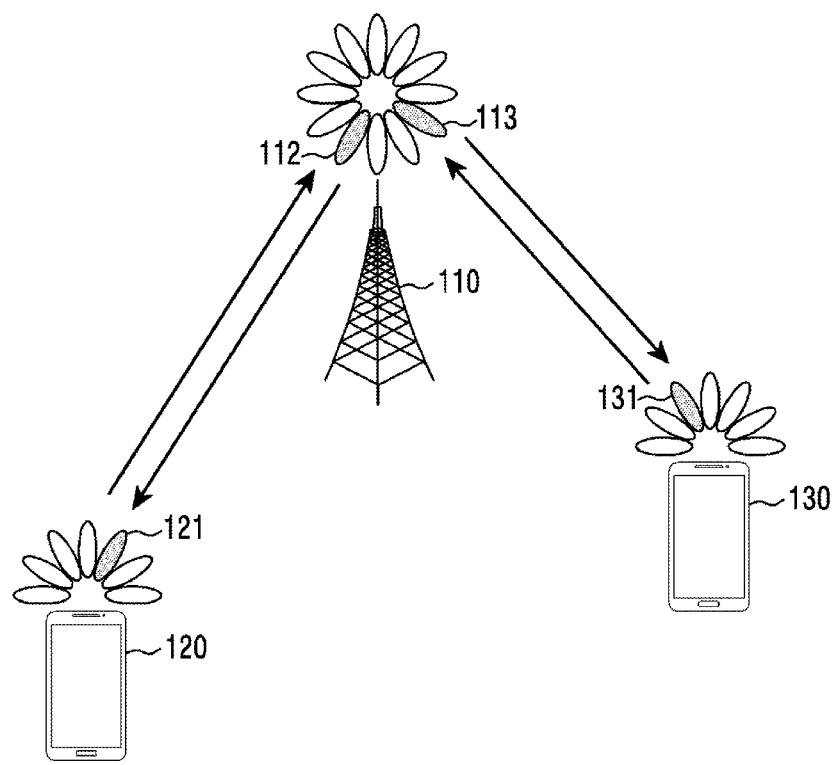

[Fig. 2]
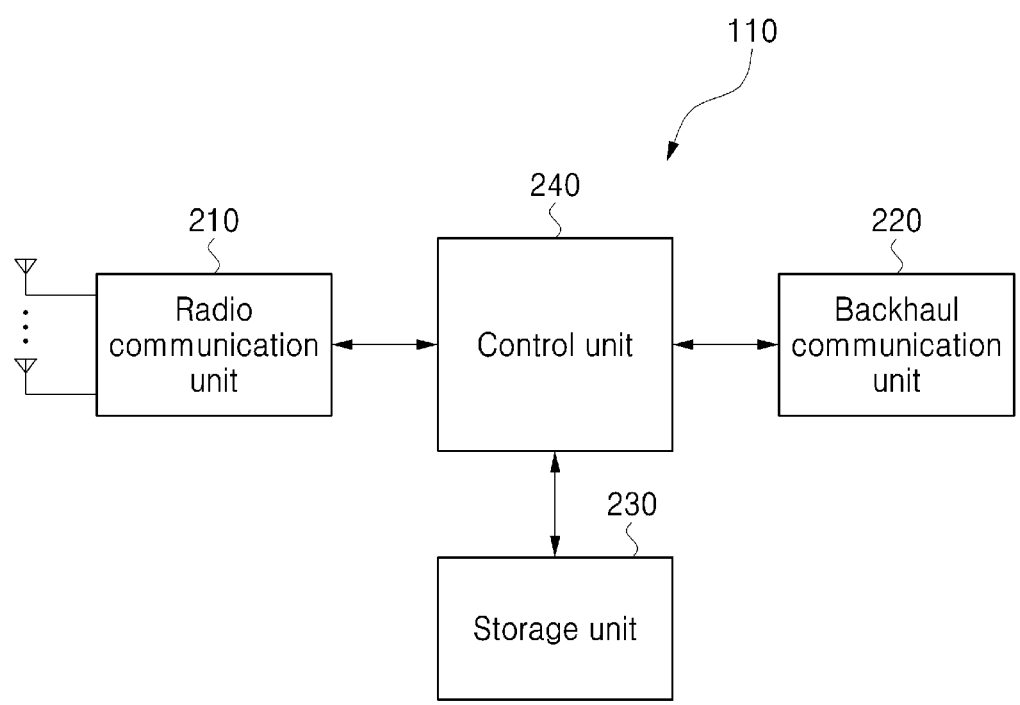

[Fig. 3]
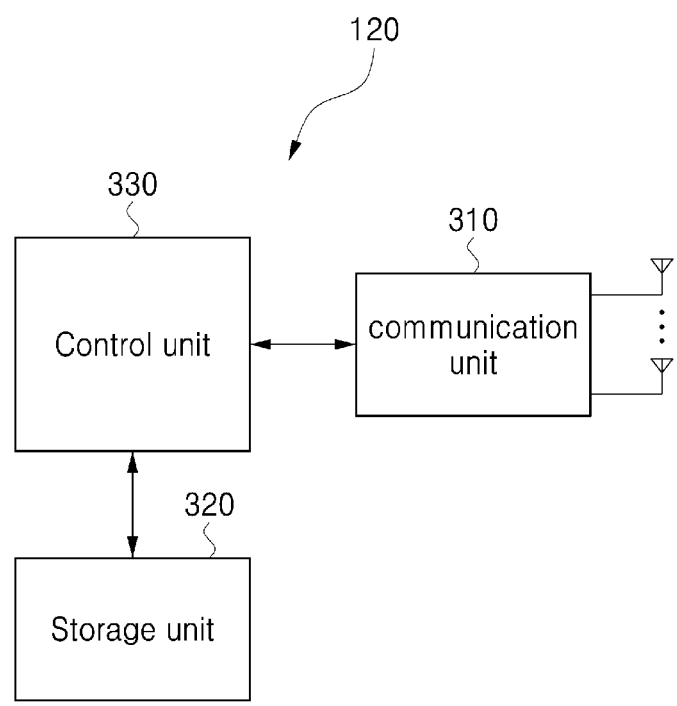

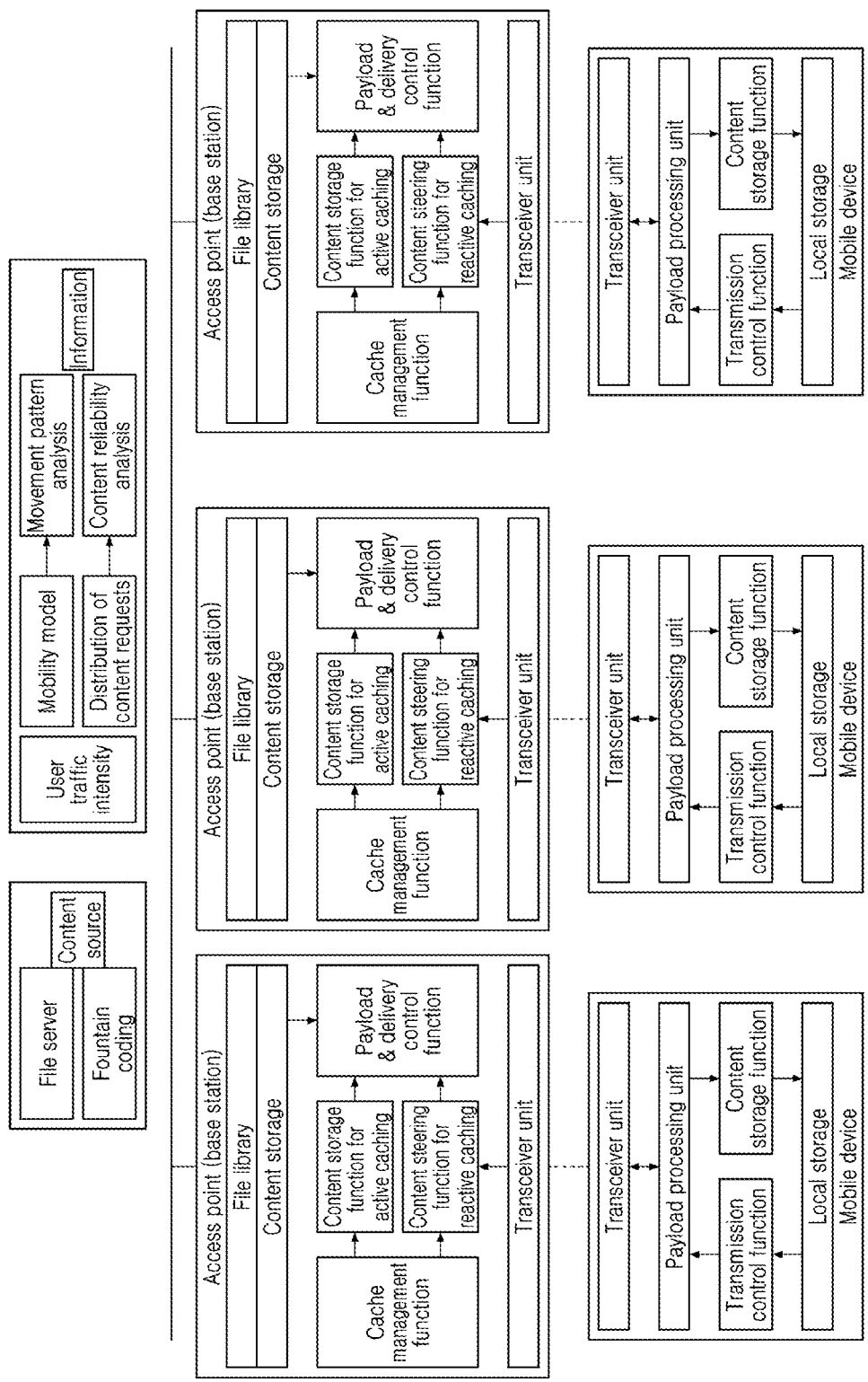
[Fig. 4]

[Fig. 5]
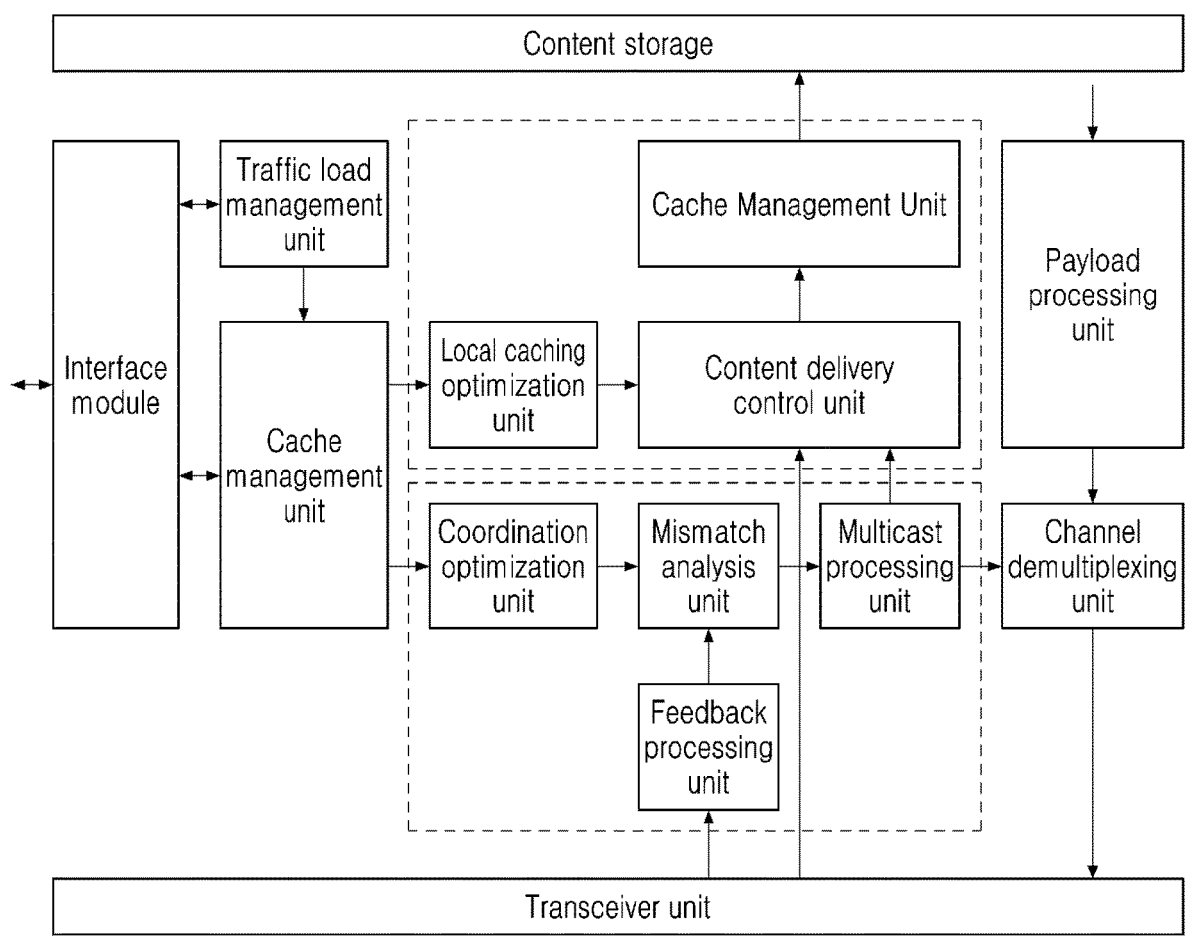

[Fig. 6]
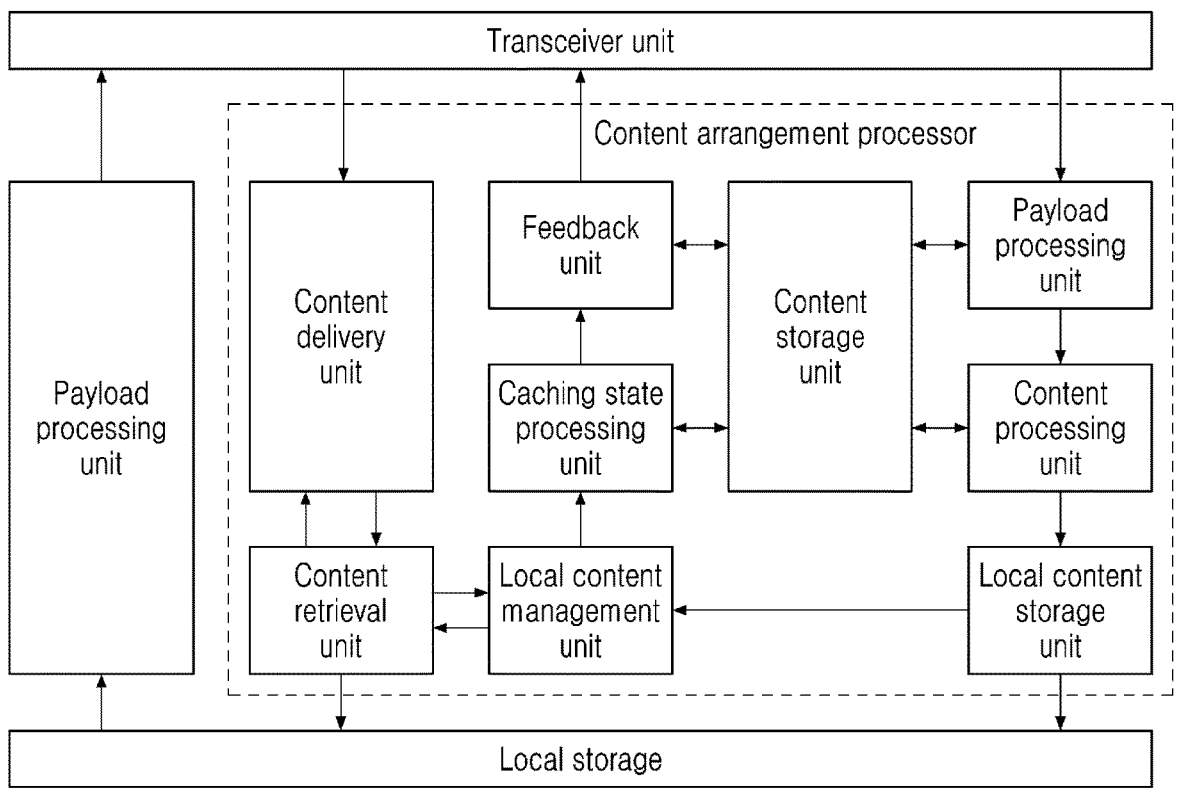

[Fig. 7]
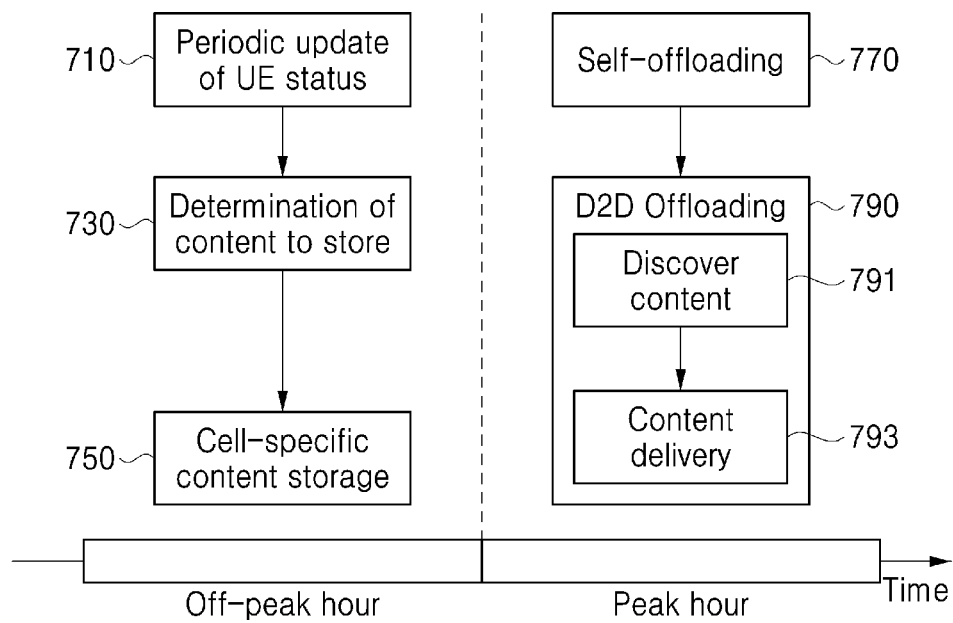

[Fig. 8]
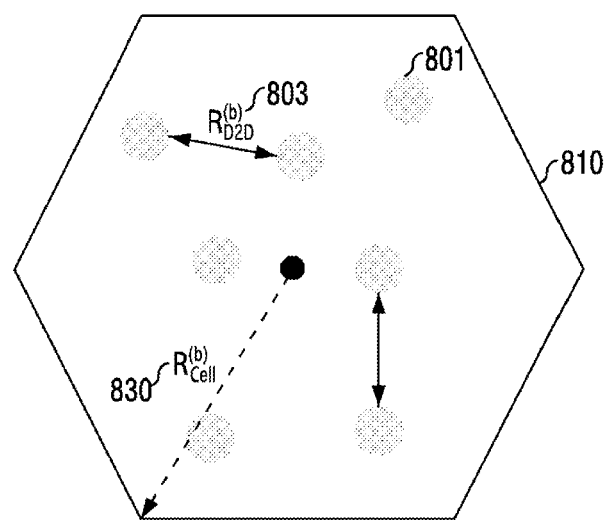

[Fig. 9]
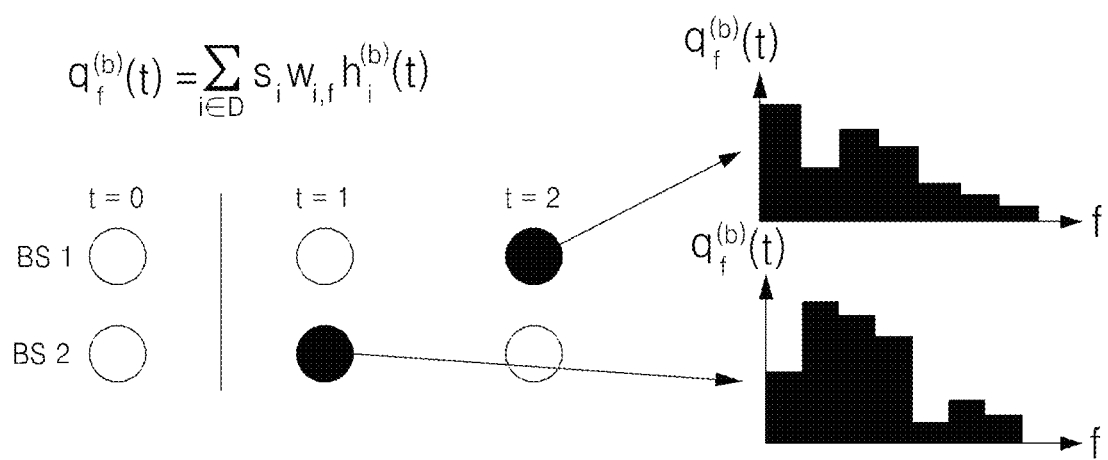

[Fig. 10]
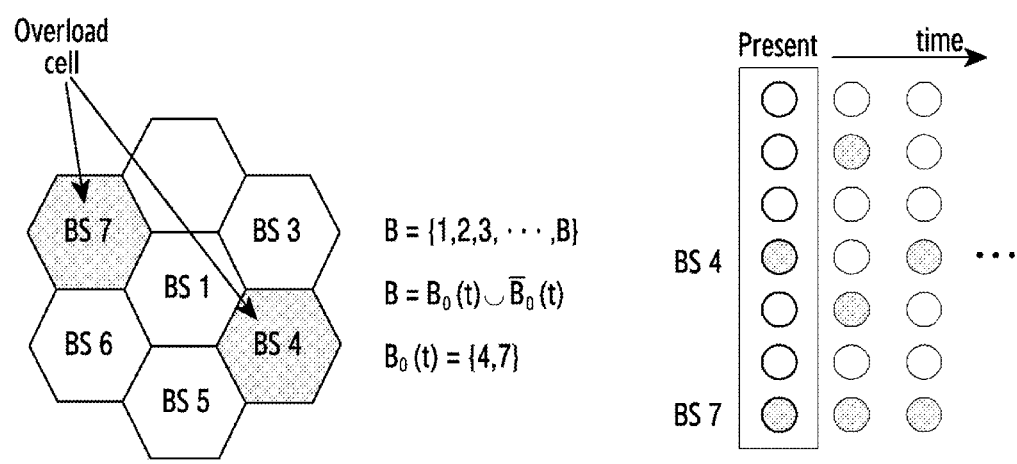

[Fig. 11]
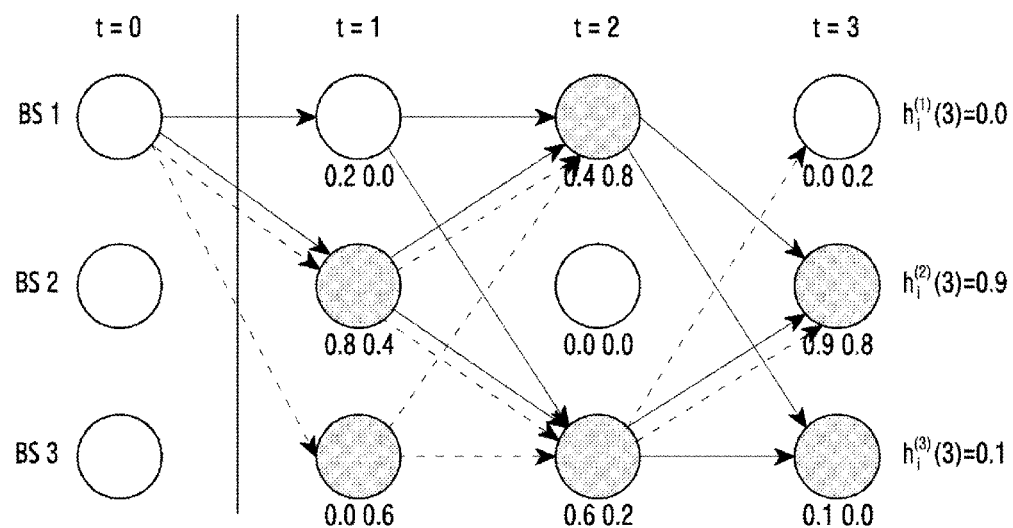

[Fig. 12]
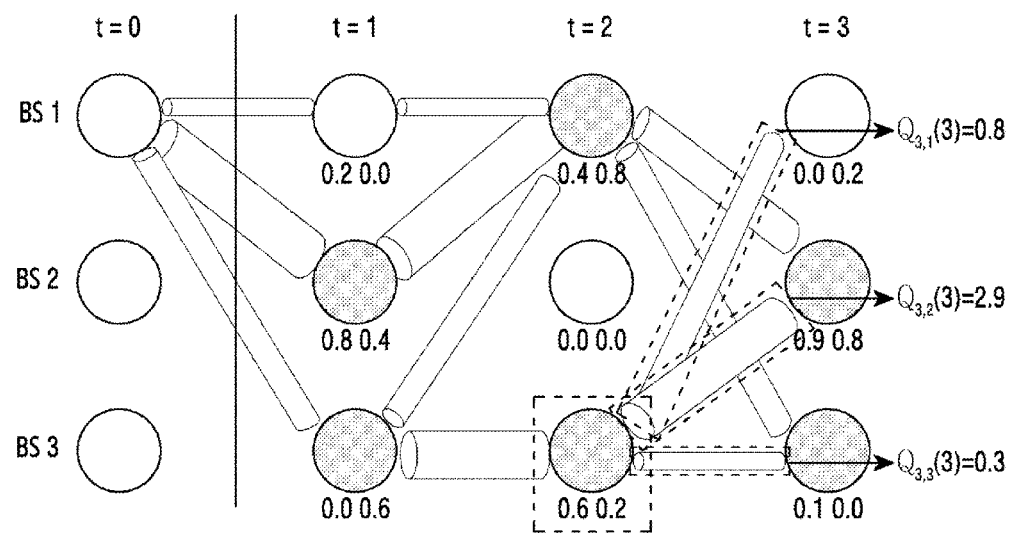
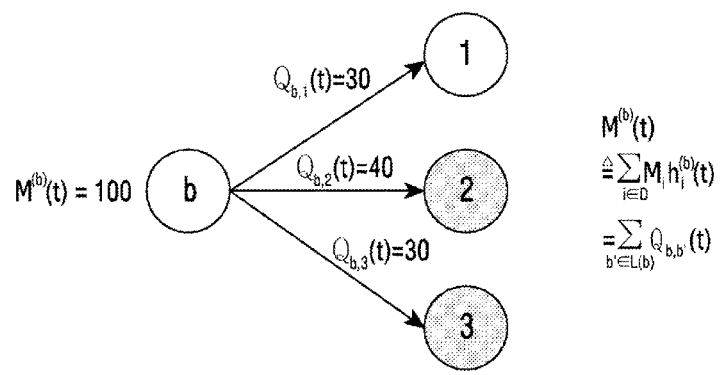

[Fig. 13]
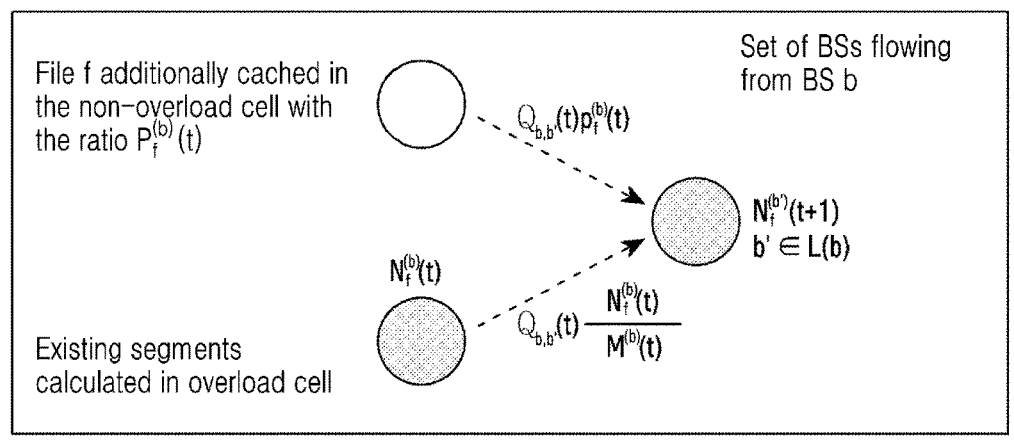

[Fig. 14]
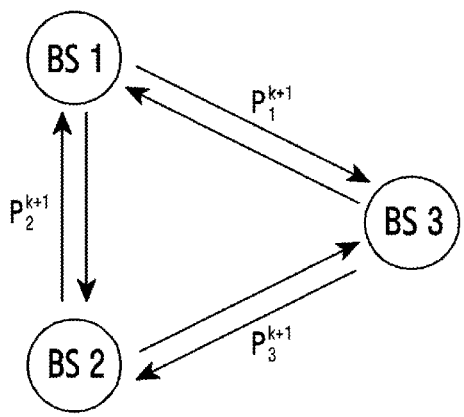

[Fig. 15]
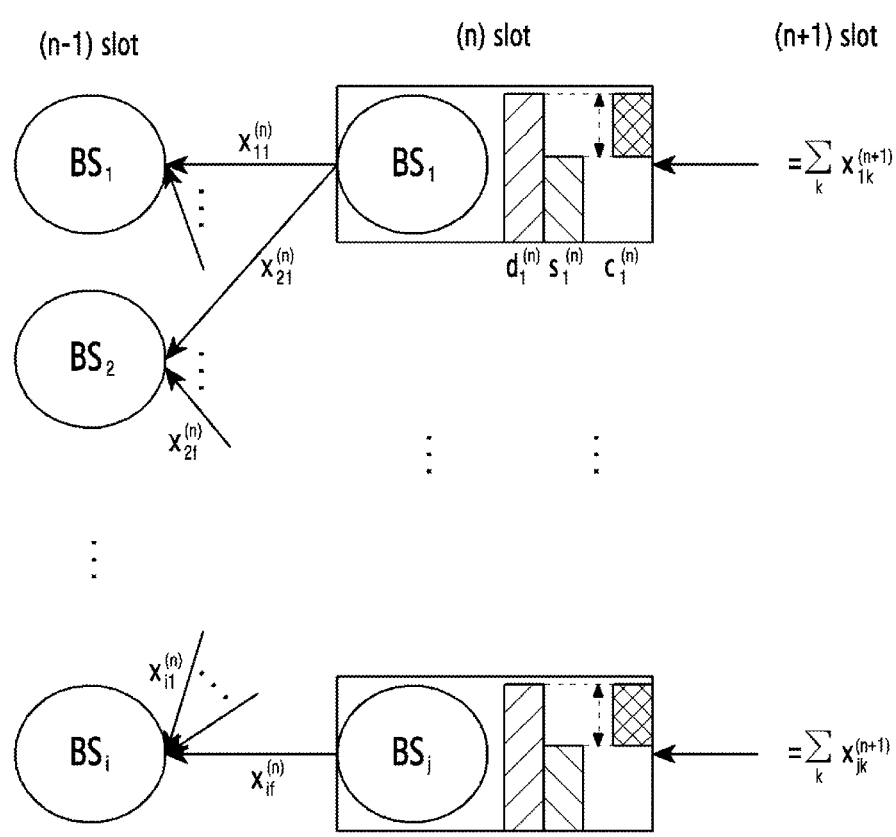

[Fig. 16]
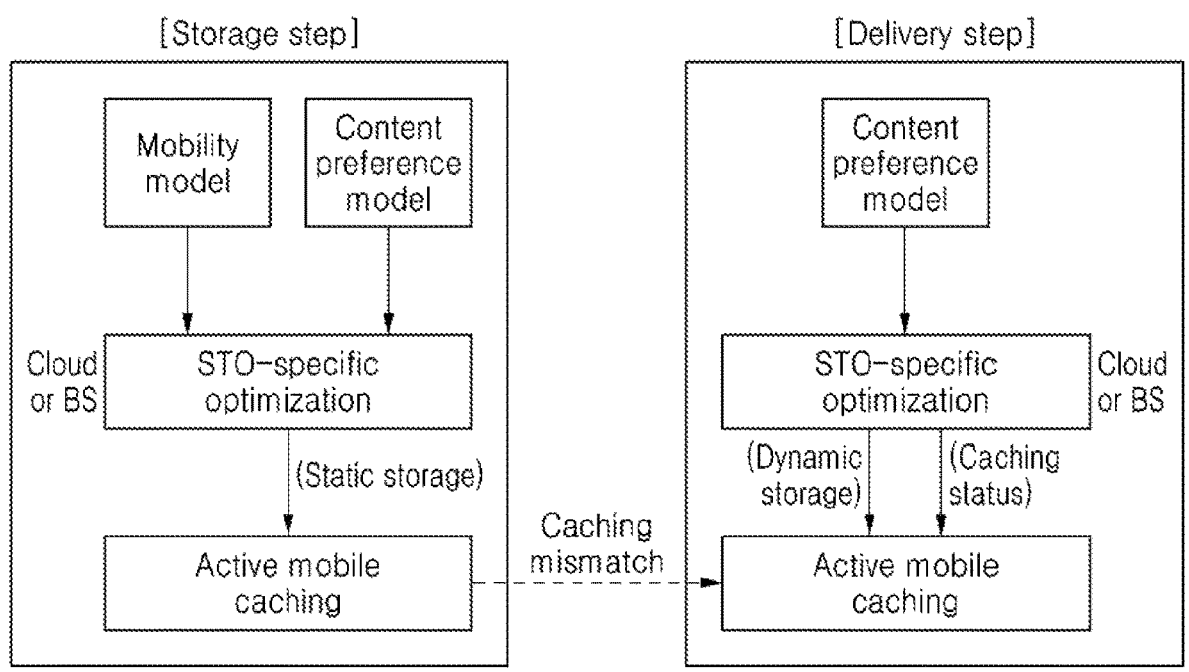

[Fig. 17]
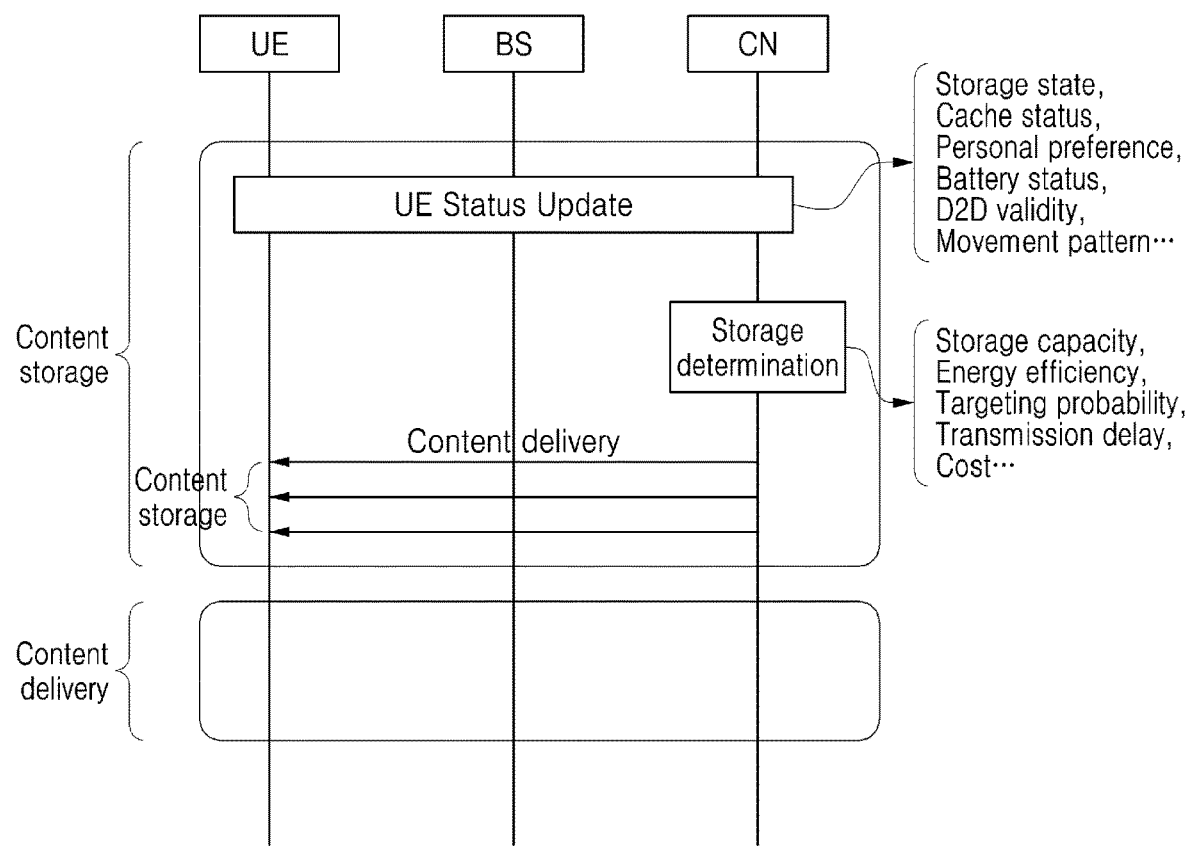

[Fig. 18]
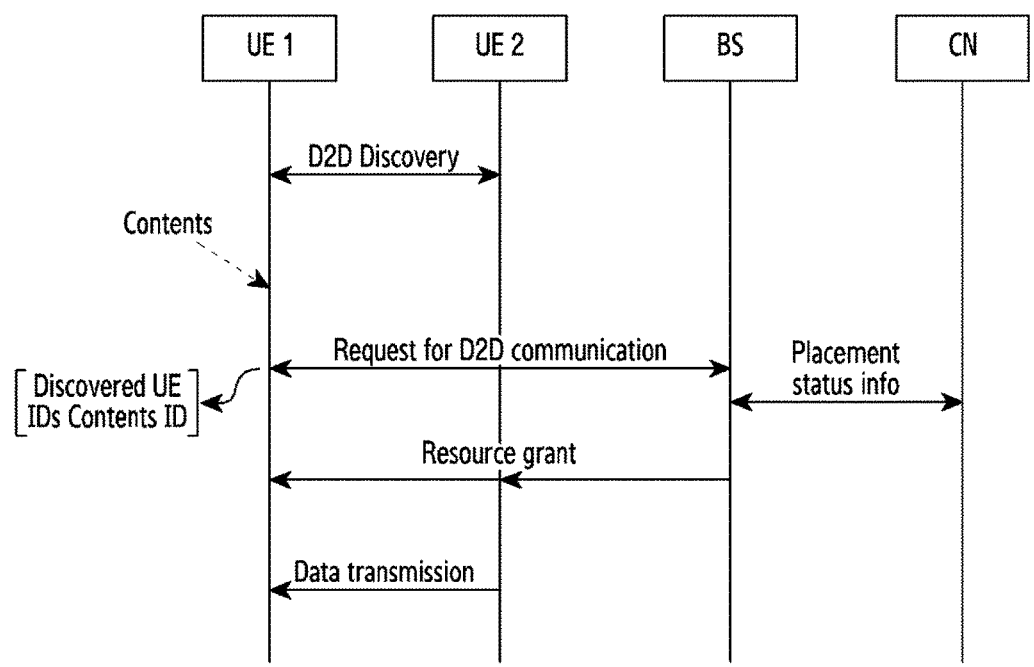

[Fig. 19]
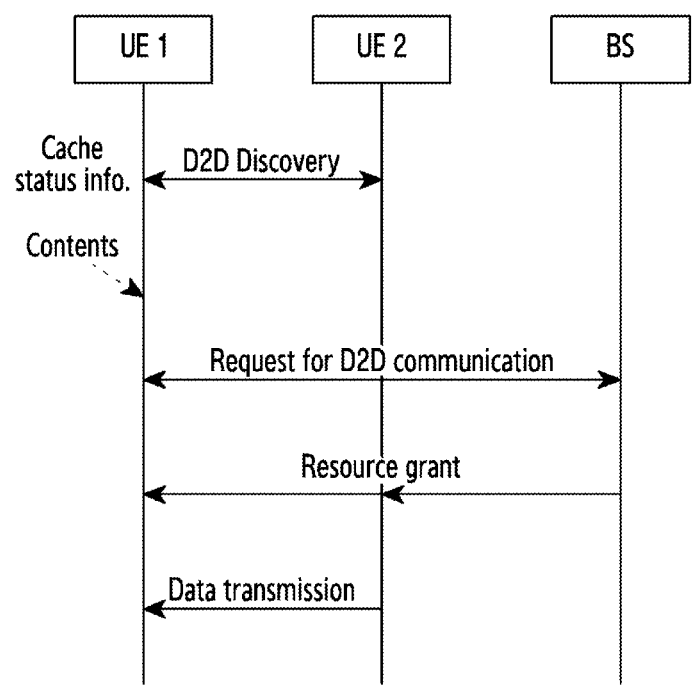

[Fig. 20]
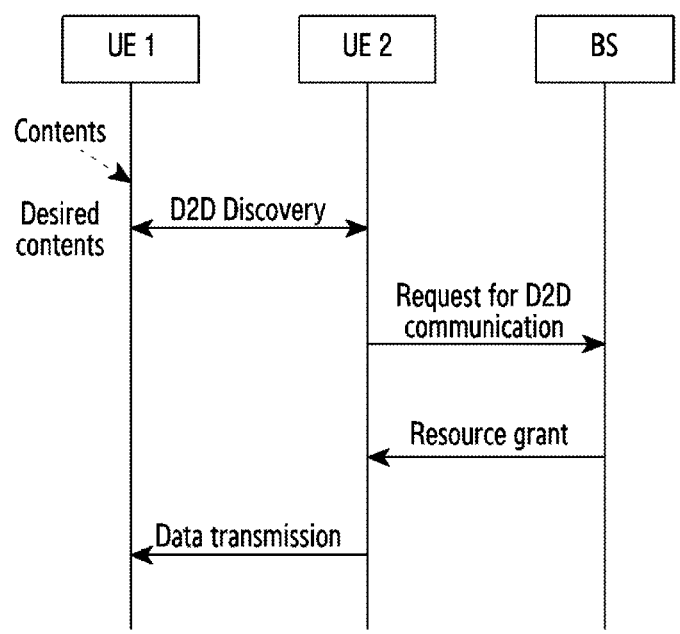

[Fig. 21]
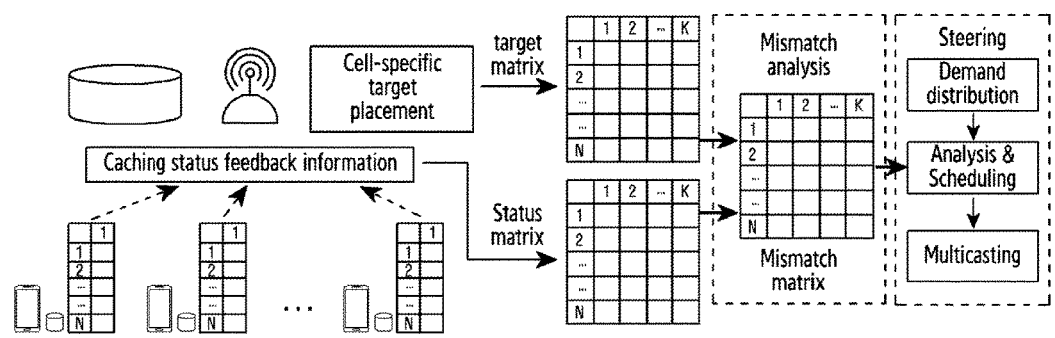

[Fig. 22]
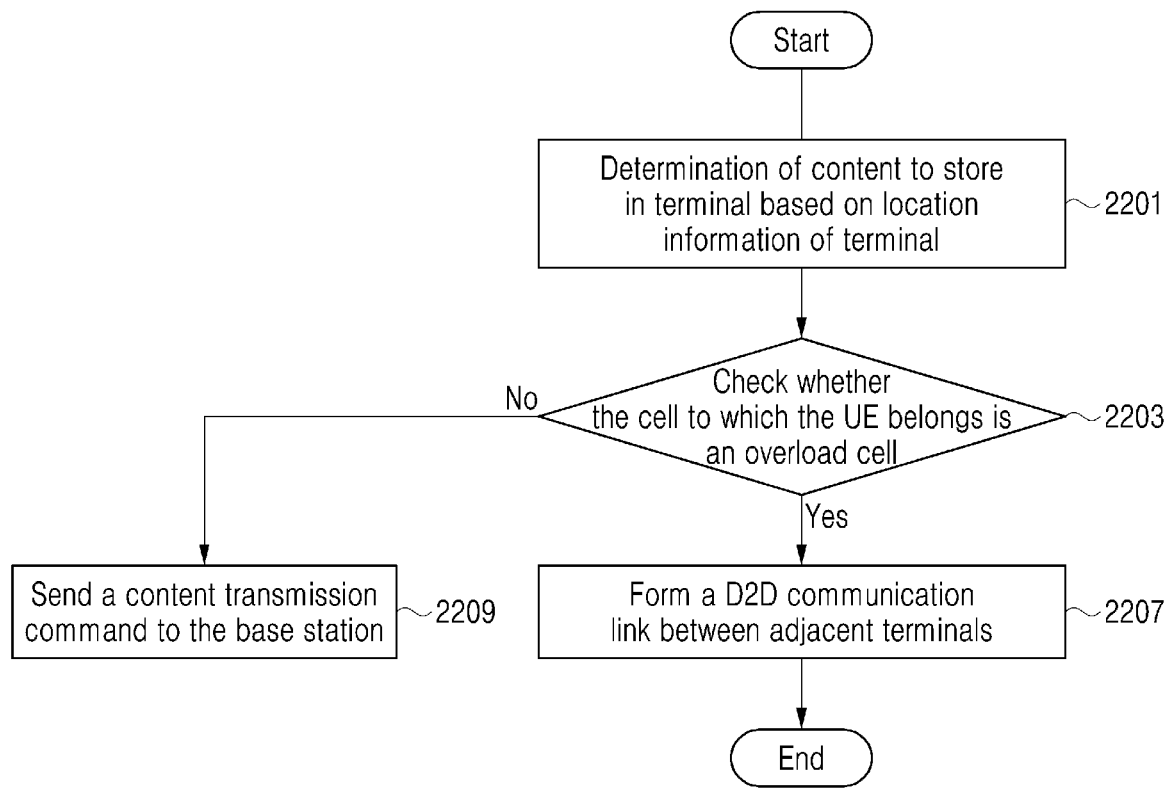

[Fig. 23]
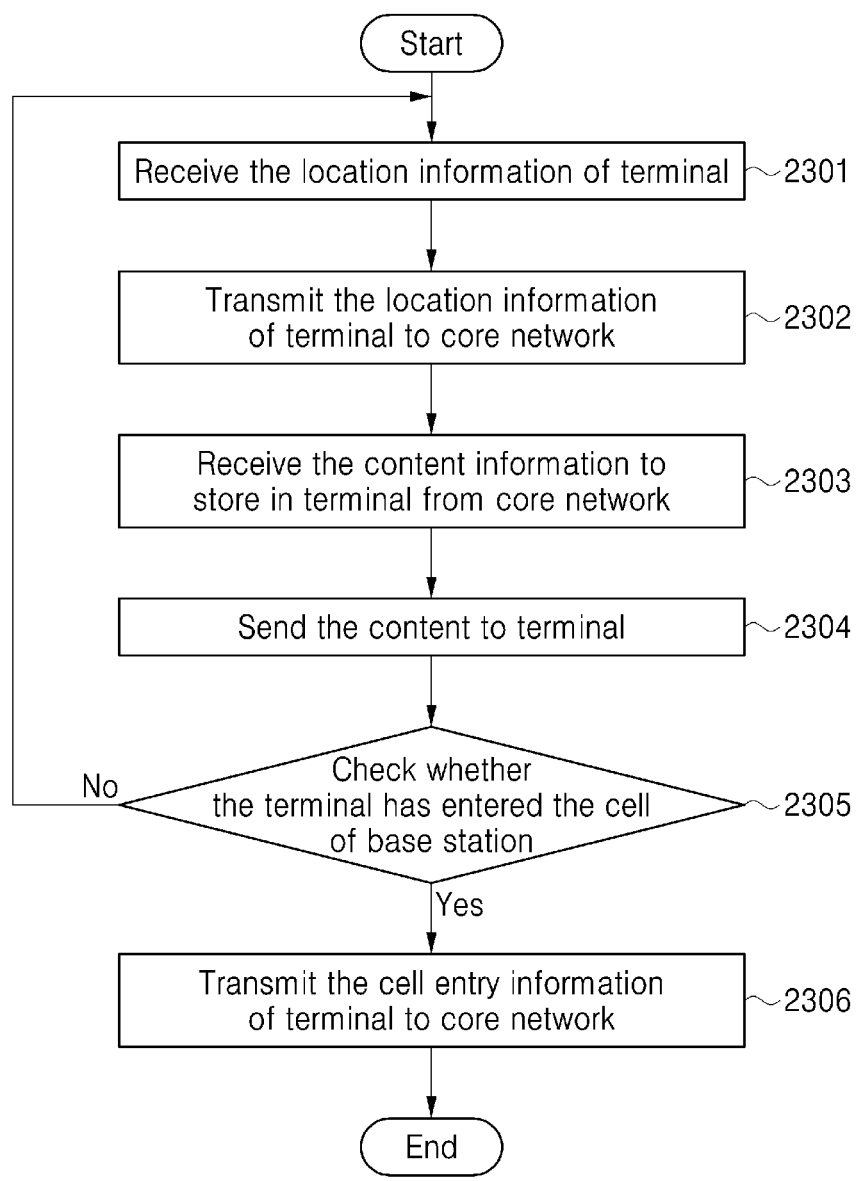

[Fig. 24]
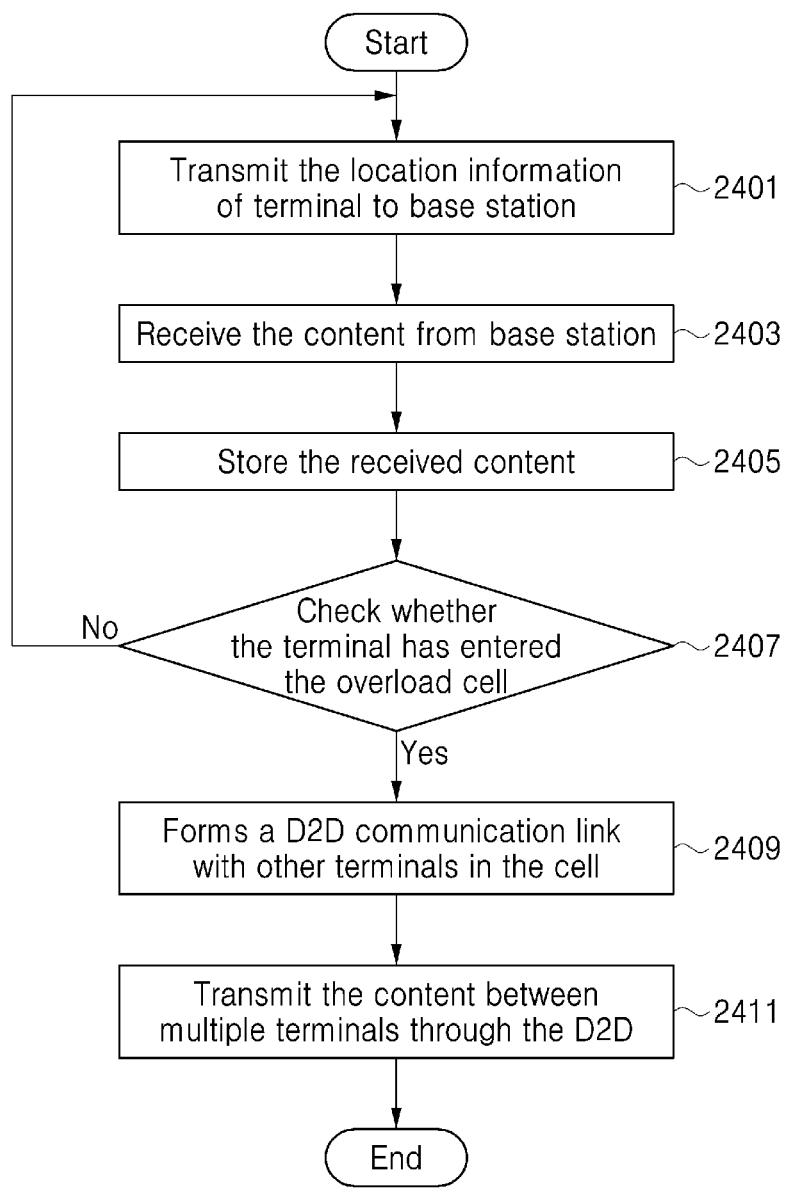

[Fig. 25A]
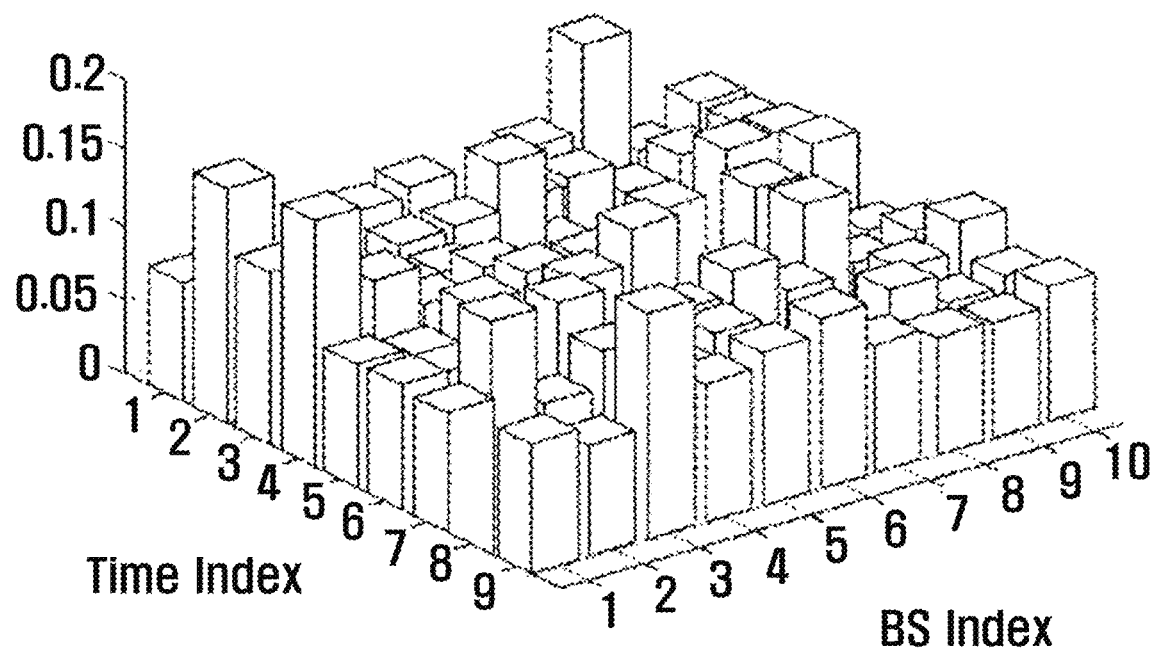

[Fig. 25B]
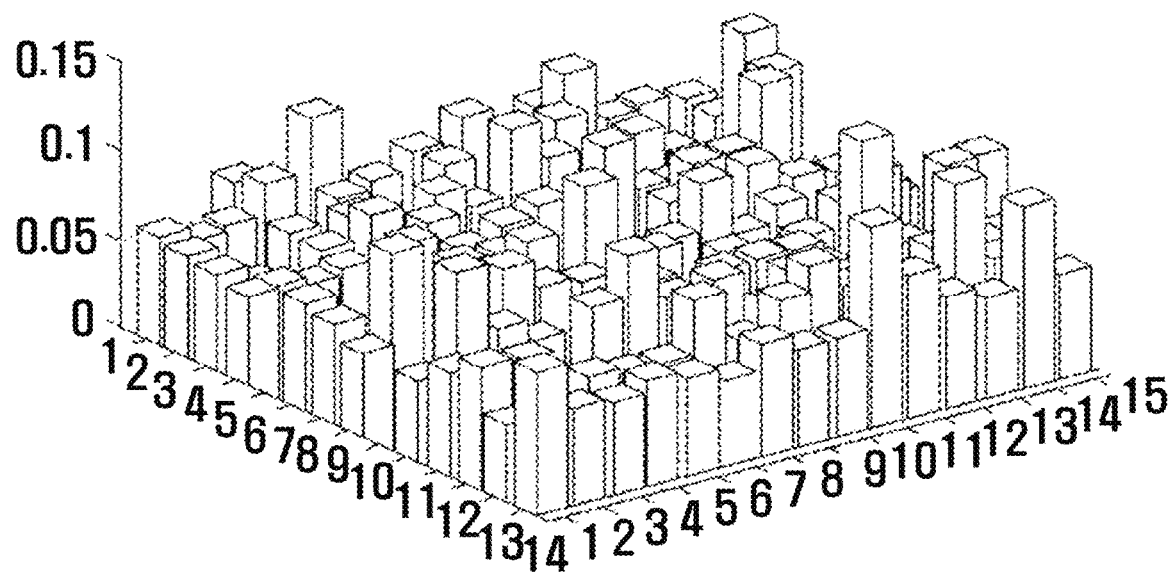

[Fig. 25C]
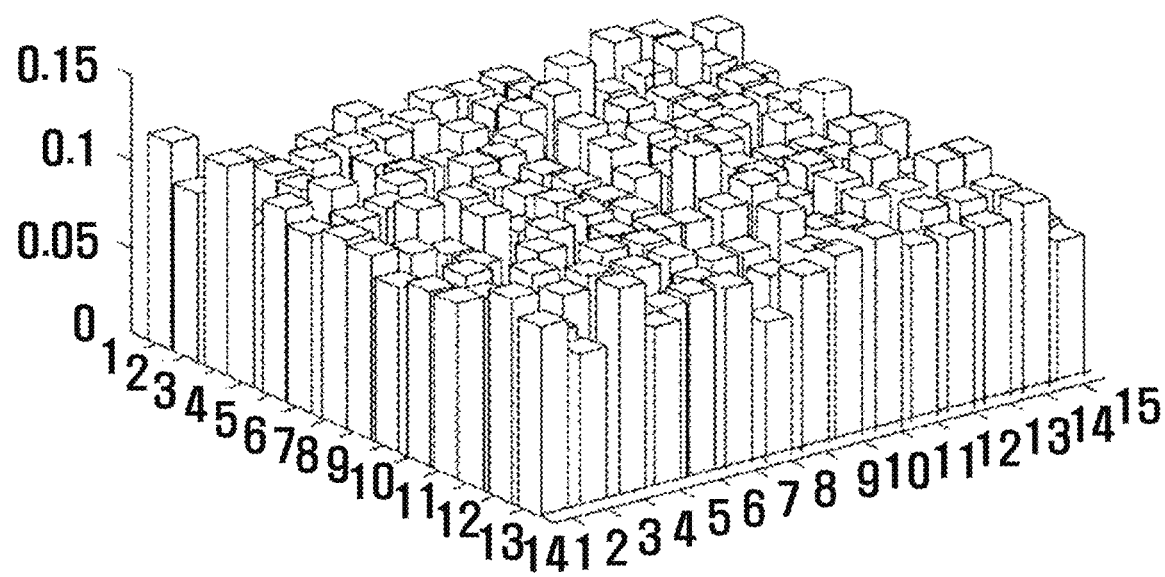

[Fig. 25D]
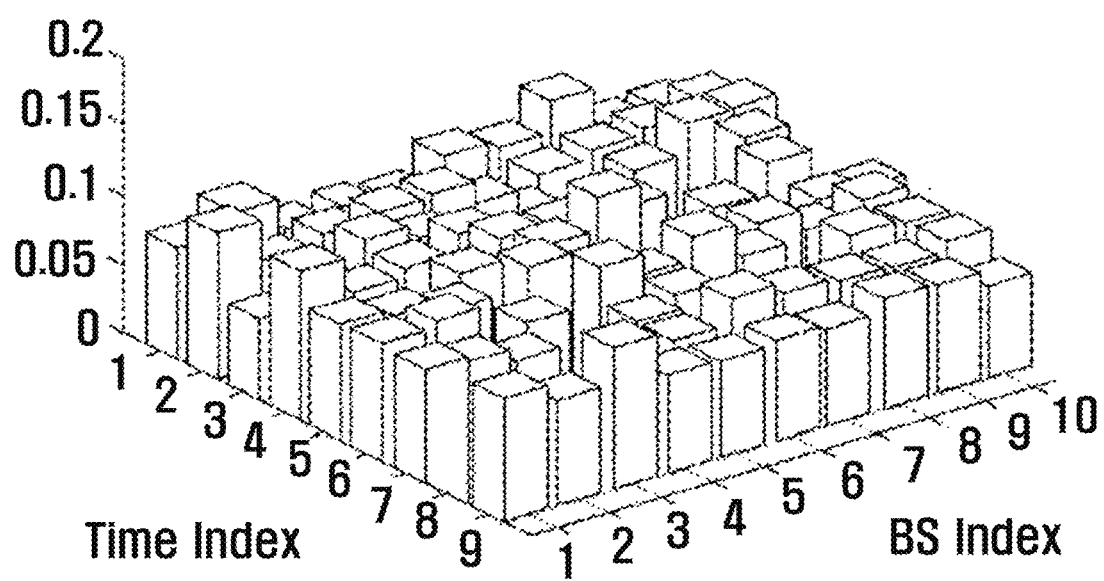

[Fig. 25E]
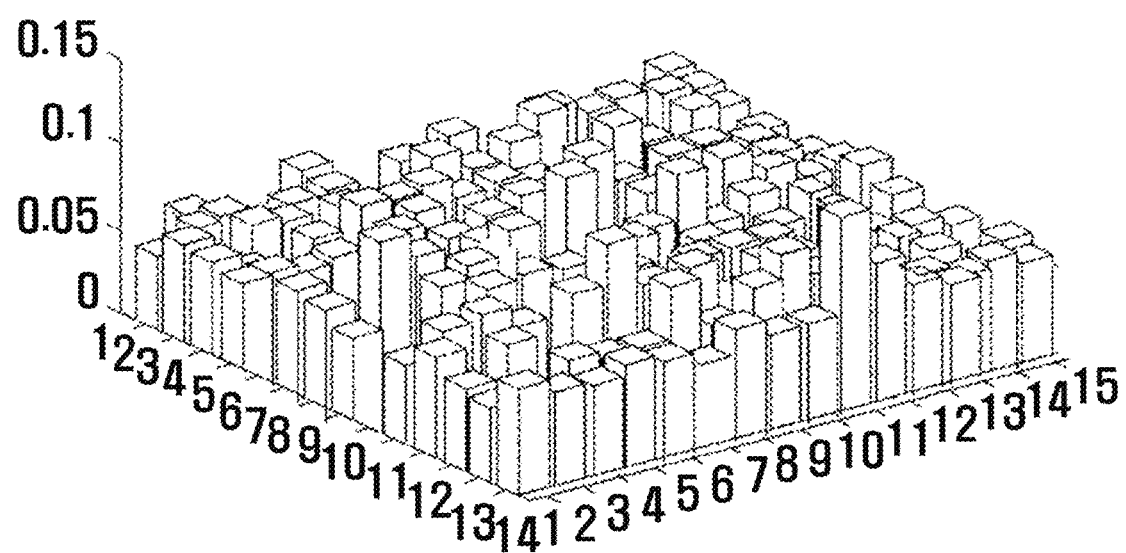

[Fig. 25F]
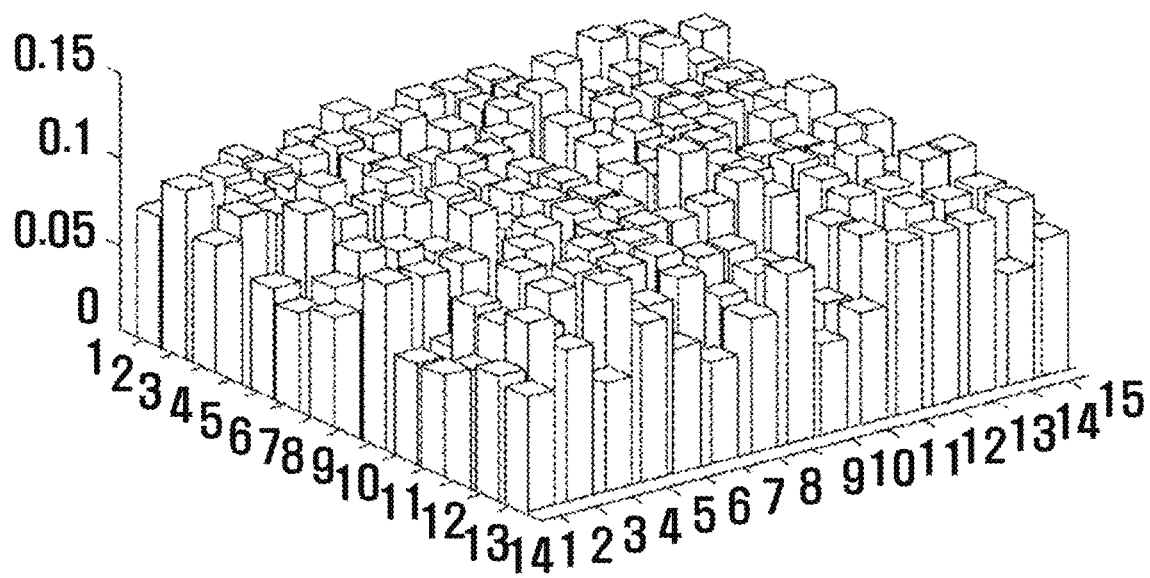

[Fig. 26]
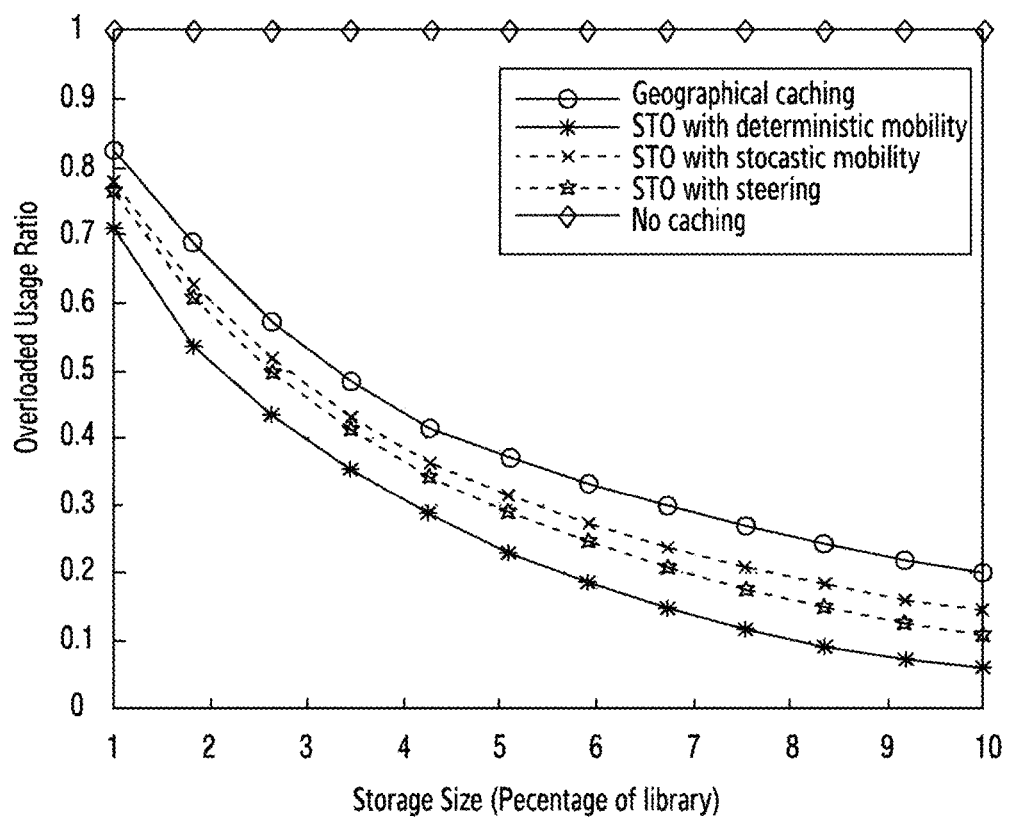

[Fig. 27]
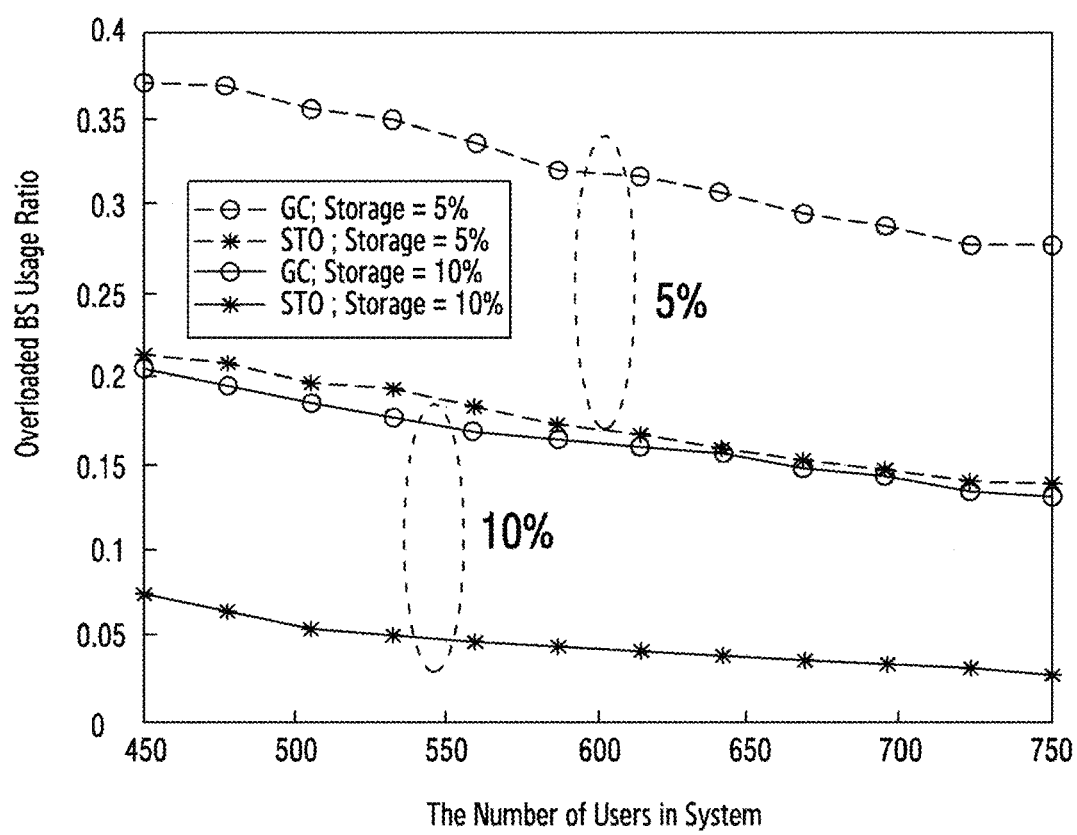

[Fig. 28]
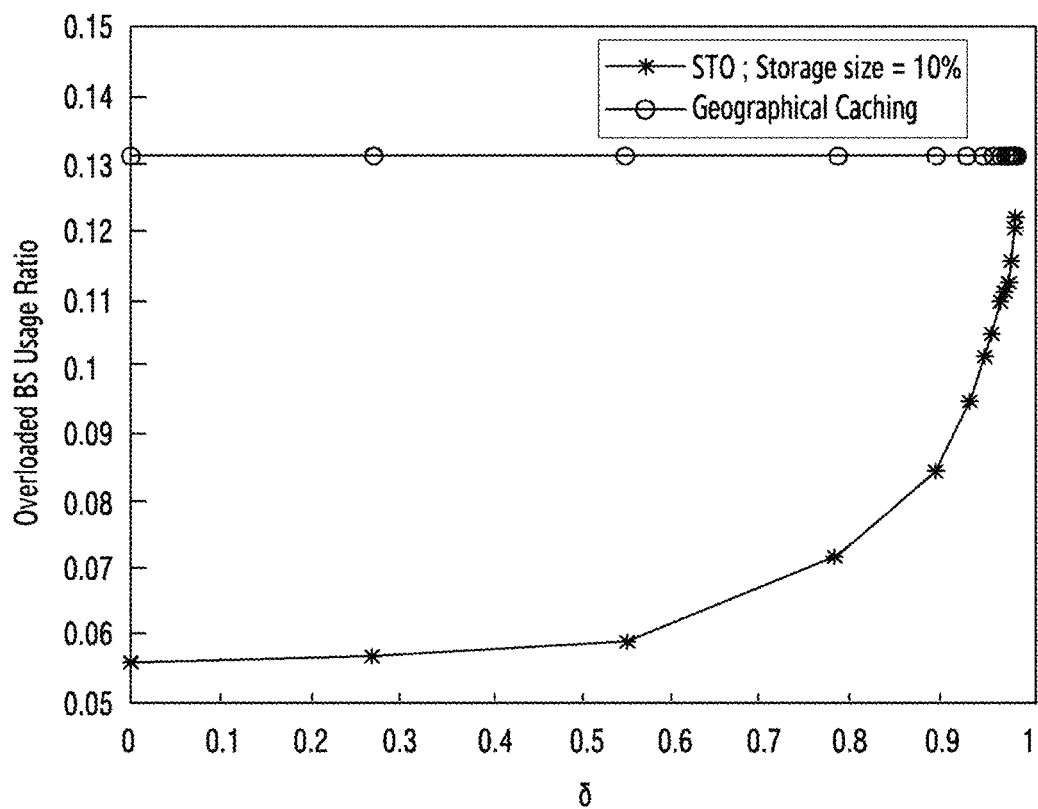

[Fig. 29]
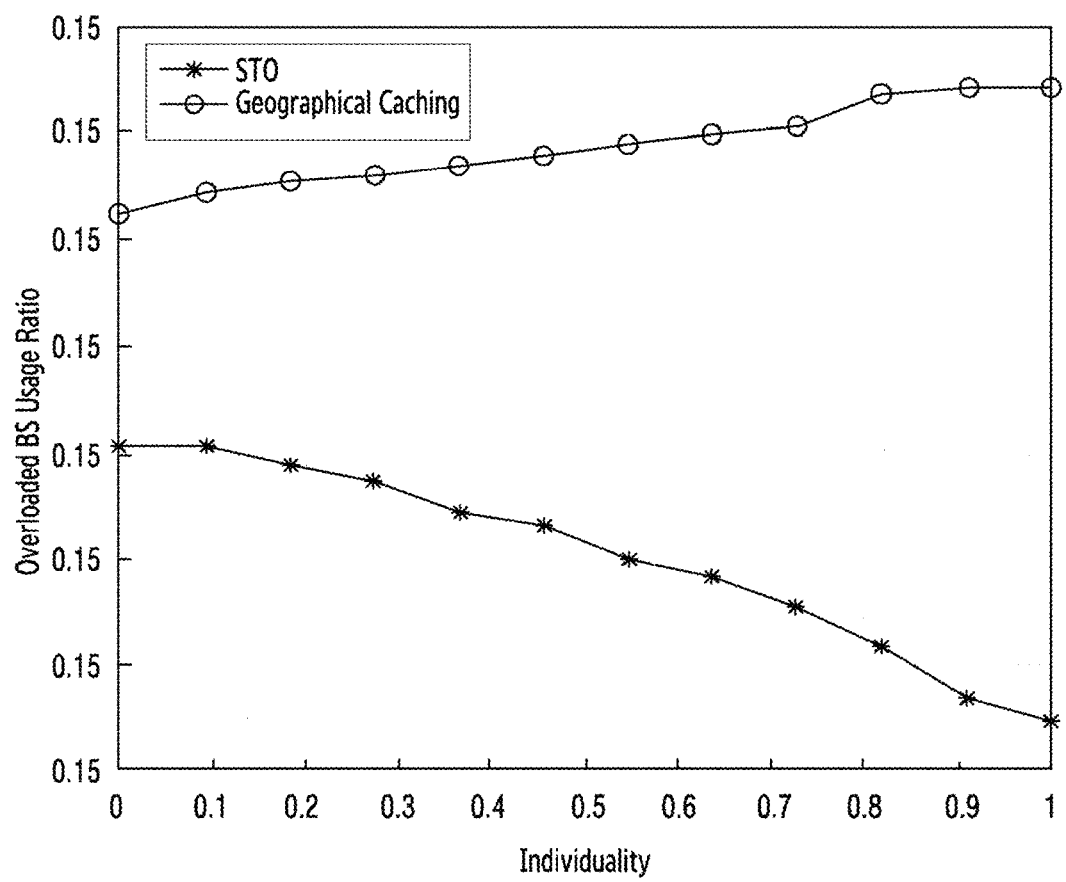

METHOD AND APPARATUS FOR CONTENT TRANSMISSION USING A TERMINAL STORAGE DEVICE IN A WIRELESS COMMUNICATION SYSTEM

CROSS REFERENCE TO RELATED APPLICATIONS

This application is a U.S. National Stage Application of International Application No. PCT/KR2020/018487, filed on Dec. 16, 2020, which claims the benefit under 35 USC 119(a) and 365(b) of Korean Patent Application No. 10-2019-0168197 filed on Dec. 16, 2019 in the Korean Intellectual Property Office, the entire disclosure of which is incorporated herein by reference for all purposes.

TECHNICAL FIELD

This disclosure relates to a wireless communication system, or more particularly, to a content transmission method and apparatus using a terminal storage device.

BACKGROUND TECHNOLOGY

In order to meet the increasing demand for wireless data traffic after commercialization of the 4G (4th generation) communication system, many efforts have been made to develop the improved the 5G (5th generation) or pre-5G communication system. For this reason, the 5G or pre-5G communication system is called the beyond 4G network (beyond 4th network) communication system or the Post LTE (long term evolution) system.

In order to achieve a high data rate, the researchers try to implement the 5G communication system in a millimeter wave (mmWave) band (e.g., in the 60 GHz band). In order to reduce the path loss of radio waves and increase the propagation distance of radio waves in the mmWave band, the technologies such as beamforming, massive MIMO, and full dimensional mimo (FD-MIMO), array antenna, analog beam-forming, and large scale antenna are being discussed in the 5G communication system.

Furthermore, to improve the network of the system, the technologies such as evolved small cell, advanced small cell, cloud radio access network (cloud RAN), ultra-dense network, device-to-device (D2D) communication, wireless backhaul, moving network, cooperative communication, coordinated multi-points (COMP), and interference cancellation are being developed in the 5G communication system.

In addition, the advanced coding modulation (ACM) methods such as hybrid frequency shift keying and quadrature amplitude modulation (FQAM) and sliding window superposition coding (SWSC) along with the advanced access technologies such as filter bank multi carrier (FBMC), non-orthogonal multiple access (NOMA), and sparse code multiple access (SCMA) are also being developed in the 5G communication system.

As the wireless communication system develops to the 5G system, it is expected to be able to provide diverse services. Therefore, there is a need for a method for smoothly providing these services.

In order to secure a dynamic range of input/output power required in the 5G system operating conditions, the power amplifier block in a radio frequency integrated circuit (RFIC) is designed to change the gain mode. However, there are many design difficulties in embedding multiple gain modes and securing optimal linearity in each gain mode at the same time. As a solution to this, it can be designed for the power amplifier to secure minimum gain modes and for an attenuator with various attenuation modes to adjust the size of the final output power. Therefore, the attenuator should be able to maintain the linearity of the power amplifier signal; an inductor is mainly used to adjust the loss due to parasitic capacitance in the minimum attenuation mode when the minimum transistors are being operated. The inductor usually requires a large space compared to other elements. Thus, there has been a constant need for a signal attenuator that can secure both spatial efficiency and optimal linearity.

DETAILED DESCRIPTION OF THE INVENTION

Technical Task

Based on the above discussion, this disclosure provides an apparatus and method for improving the efficiency of content transmission in a wireless communication system.

Effects obtainable in this disclosure are not limited to the above-mentioned ones, and other unmentioned effects may be clearly understood by ordinary technicians in the field, to which this disclosure belongs, from the description below.

Technical Solution

According to various embodiments of this disclosure, the method for operating the core network in a wireless communication system comprises a process of determining a content to be stored in a terminal based on location information of the terminal, a process of transmitting the command to the base station to transmit the content to the terminal in response to the determination, a process of checking whether the terminal has entered the overload cell and, when it is confirmed that the terminal has entered the overload cell, a process of forming a D2D communication link between the above-mentioned terminal and another adjacent terminal.

According to various embodiments of this disclosure, the method for operating a base station in a wireless communication system comprises a process of receiving the location information of a terminal, a process of transmitting the location information of the terminal to the core network, a process of receiving the content information to store in the terminal from the core network, a process of transmitting the above-mentioned content to the above-mentioned terminal according to the above-mentioned content information, a process of confirming whether the above-mentioned terminal has entered the cell of the above-mentioned base station, and a process of transmitting the cell entry information of the above-mentioned terminal to the above-mentioned core network.

According to various embodiments of this disclosure, the method for operating a terminal in a wireless communication system comprises a process of transmitting the location information of the above-mentioned terminal to a base station, a process of receiving the content from the base station, a process of storing the received content, a process of confirming whether the terminal has entered the overload cell, a process of forming a D2D communication link with another terminal in the cell in response to the terminal having entered the overload cell, and a process of transmitting the content from the terminal to the other terminal through the above-mentioned D2D communication link.

According to another mode of this disclosure, the apparatus including a core network in a wireless communication system comprises a transceiver and one or more processors connected to the transceiver, wherein the above-mentioned processors determine the content to be stored in a terminal based on location information of the terminal, transmit the command to the terminal to transmit the content to the base station in response to the determination, confirm whether the terminal has entered the overload cell and, when it is confirmed that the terminal entered the overload cell, form a D2D communication link between the above-mentioned terminal and another adjacent terminal.

According to another mode of this disclosure, the apparatus including a base station in a wireless communication system comprises a transceiver and one or more processors connected to the transceiver, wherein the above-mentioned processors receive the location information of a terminal, transmit the location information of the terminal to a core network, receive the content information to be stored in the terminal from the core network, transmit the above-mentioned content to the terminal according to the content information, confirm whether the terminal has entered the overload cell and transmit the cell entry information of the terminal to the core network.

According to another mode of this disclosure, the apparatus including a terminal in a wireless communication system comprises one or more processors that transmit the location information of the terminal to a base station, receive the content from the base station, save the received content, confirm whether the terminal has entered the overload cell, form a D2D communication link with other terminals in the cell in response to the terminal having entered the overload cell, and transmit the content between the above-mentioned terminal and the other terminal through the D2D communication link.

Effects of Invention

The apparatus and method according to various embodiments of this disclosure can provide an effect of improving the content transmission efficiency in an overload cell.

Effects obtainable in this disclosure are not limited to the above-mentioned effect, and other unmentioned effects may be clearly understood by ordinary technicians in the field, to which this disclosure belongs, from the descriptions below.

BRIEF DESCRIPTION OF DRAWINGS

FIG. 1 illustrates a wireless communication system according to various embodiments of this disclosure.

FIG. 2 illustrates a configuration of a base station in a wireless communication system according to various embodiments of this disclosure.

FIG. 3 illustrates a configuration of a terminal in a wireless communication system according to various embodiments of this disclosure.

FIG. 4 illustrates an integrated structure for mobile caching in a wireless communication system according to various embodiments of this disclosure.

FIG. 5 illustrates a base station configuration for mobile caching in a wireless communication system according to various embodiments of this disclosure.

FIG. 6 illustrates a terminal configuration for mobile caching in a wireless communication system according to various embodiments of this disclosure.

FIG. 7 illustrates an operation of a terminal for mobile caching in a wireless communication system according to various embodiments of this disclosure.

FIG. 8 illustrates a relationship between terminals belonging to a specific cell in a wireless communication system according to various embodiments of this disclosure.

FIG. 9 illustrates the individual content preference graphs for each cell in a wireless communication system according to various embodiments of this disclosure.

FIG. 10 illustrates the classification of an overload cell and a non-overload cell in a wireless communication system according to various embodiments of this disclosure.

FIG. 11 illustrates a mobility model for each cell of each terminal forming a D2D link in a wireless communication system according to various embodiments of this disclosure.

FIG. 12 illustrates an aggregate flow model for each cell of each terminal forming a D2D link in a wireless communication system according to various embodiments of this disclosure.

FIG. 13 illustrates a change in the number of segments according to cell-to-cell movement of a terminal in a wireless communication system according to various embodiments of this disclosure.

FIG. 14 illustrates a method to store the content in a terminal performing mobile caching in a wireless communication system according to various embodiments of this disclosure.

FIG. 15 illustrates another method to store the content in a terminal performing mobile caching in a wireless communication system according to various embodiments of this disclosure.

FIG. 16 illustrates a process in which mobile caching is performed in a wireless communication system according to various embodiments of this disclosure.

FIG. 17 is a flowchart illustrating a process in which mobile caching is performed in a wireless communication system according to various embodiments of this disclosure.

FIG. 18 is a flowchart illustrating a content discovery procedure using a tracker in a wireless communication system according to various embodiments of this disclosure.

FIG. 19 is a flowchart illustrating a content discovery procedure based on a receiver in a wireless communication system according to various embodiments of this disclosure.

FIG. 20 is a flowchart illustrating a content discovery procedure based on a transmitter in a wireless communication system according to various embodiments of this disclosure.

FIG. 21 illustrates an operation of a delivery adjustment procedure in a wireless communication system according to various embodiments of this disclosure.

FIG. 22 is a flowchart illustrating an operation of a core network in a wireless communication system according to various embodiments of this disclosure.

FIG. 23 is a flowchart illustrating an operation of a base station in a wireless communication system according to various embodiments of this disclosure.

FIG. 24 is a flowchart illustrating an operation of a terminal in a wireless communication system according to various embodiments of this disclosure.

FIGS. 25A to 25F illustrate the effect of distributing a traffic load in space and time by caching in a wireless communication system according to various embodiments of this disclosure.

FIG. 26 illustrates the access link load usage ratio according to the size of a storage device in a wireless communication system according to various embodiments of this disclosure.

FIG. 27 illustrates the access link load usage ratio according to the number of users in a wireless communication system according to various embodiments of this disclosure.

FIG. 28 illustrates the access link load usage ratio according to the mobility prediction variability of a terminal in a wireless communication system according to various embodiments of this disclosure.

FIG. 29 illustrates the access link load usage ratio according to different degrees of content preference of terminals in a wireless communication system according to various embodiments of this disclosure.

BEST MODE FOR IMPLEMENTATION OF INVENTION

The terms used in this disclosure are used only to describe specific embodiments, and are not intended to limit the scope of other embodiments. The singular expression may include the plural expression unless the context clearly dictates otherwise. The terms used herein, including technical or scientific ones, may have the same meanings as commonly understood by ordinary technicians in the field described in this disclosure. Among the terms used in this disclosure, those defined in a general dictionary may be interpreted with the same or similar meaning as the meaning in the context of the related technical field and, unless explicitly defined in the present disclosure, are not interpreted as ideal or excessively formal meanings. In some cases, even the terms defined in this disclosure should not be construed to exclude embodiments of this disclosure.

In various embodiments of this disclosure described below, a hardware approach method is described as an example. However, since various embodiments of this disclosure include the technology using both of hardware and software, the embodiment example of this disclosure does not exclude a software-based approach.

Hereinafter, this disclosure relates to an apparatus and method for transmitting the content using a terminal storage device in a wireless communication system. More specifically, this disclosure describes a technique for improving the efficiency of data transfer in an overload cell by sharing the content with an adjacent terminal using a storage device of a terminal that performs the mobile caching in a wireless communication system.

The terms referring to signals, channels, control information, network entities, and components of apparatus used in the following description are those exemplified for convenience. Accordingly, this disclosure is not limited to the terms described below, and other terms having equivalent technical meanings may be used in it.

In addition, the expressions of "more than" or "less than" are used to determine whether a specific condition is satisfied or fulfilled in this disclosure, but they are only an expression to describe an example, and the "equal" is not excluded. That is, the conditions expressed as 'more than' may be replaced with 'equal or more', those expressed as 'less than' with 'equal or less', and those expressed as 'more than and less than' with 'equal or more and equal or less'.

Furthermore, although this disclosure describes various embodiments with the terms used in some communication standards (e.g., 3rd Generation Partnership Project (3GPP)), they are only an example for description. Various embodiments of this disclosure may be easily modified and applied in other communication systems.

FIG. 1 illustrates a wireless communication system according to various embodiments of this disclosure.

FIG. 1 illustrates a base station (110), a terminal (120), and a terminal (130) as some of nodes using the wireless channels in a wireless communication system. FIG. 1 shows only one base station, other base stations that are the same as or similar to the base station (110) may be further included.

The base station (110) is a network infrastructure that provides the wireless access to the terminals (120 and 130). The base station (110) has a coverage defined as a certain geographic area based on a distance capable of transmitting a signal. In addition to a base station (110), it can also be called an 'access point (AP)', an 'eNodeB (eNB)', a '5G node (5th generation node)', a 'next generation nodeB' (gNB)', a 'wireless point', a 'transmission/reception point (TRP)', or other terms having an equivalent technical meaning.

Each of the terminals (120 and 130) is a device used by a user, and performs communication with the base station (110) through a wireless channel. In some cases, at least one of the terminals (120 and 130) may be operated without the user's involvement. That is, at least one of the terminals (120 and 130) is a device that performs the machine type communication (MTC) and is not carried by the user. Each of the terminals (120 and 130) can also be called a 'user equipment (UE)', a 'mobile station', a 'subscriber station', a 'remote terminal', a 'wireless terminal', a 'user device' or other terms having an equivalent technical meaning.

The base station (110), the terminal (120), and the terminal (130) may transmit and receive radio signals in millimeter wave (mmWave) bands (e.g., 28 GHZ, 30 GHZ, 38 GHZ, and 60 GHZ). At this time, in order to improve the channel gain, the base station (110), the terminal (120), and the terminal (130) may perform the beamforming. Here, the beamforming can include the transmit beamforming and the receive beamforming. That is, the base station (110), the terminal (120), and the terminal (130) may impart directivity to a transmission signal or a reception signal. To this end, the base station (110) and the terminals (120 and 130) may select the serving beams (112, 113, 121, and 131) through a beam search or beam management procedure. After the serving beams (112, 113, 121, and 131) are selected, subsequent communication may be performed through a resource having a quasi co-located (QCL) relationship with the resource transmitting the serving beams (112, 113, 121, 131).

If the large-scale characteristics of the channel carrying the symbol on the first antenna port can be inferred from the channel carrying the symbol on the second antenna port, the first and the second antenna ports can be evaluated to be in a QCL relationship. For example, the large-scale characteristics can include at least one of delay spread, Doppler spread, Doppler shift, average gain, average delay, and spatial receiver parameter.

FIG. 2 illustrates a configuration of a base station in a wireless communication system according to various embodiments of this disclosure.

The configuration in FIG. 2 may be understood as that of the base station (110). The term '. . . unit' or ' . . . er' used hereinafter refers to a device that processes at least one function or operation, which may be implemented through hardware, software, or a combination of hardware and software.

In FIG. 2, the base station comprises a wireless communication unit (210), a backhaul communication unit (220), a storage unit (230), and a control unit (240).

The wireless communication unit (210) performs the function for transmitting and receiving signals through a wireless channel. For example, the wireless communication unit (210) performs a conversion between the baseband signal and the transmitted bit stream according to the physical layer standard of the system. When transmitting the data, the wireless communication unit (210) generates the complex symbols by encoding and modulating the transmitted bit stream. And, when receiving the data, the wireless communication unit (210) restores the received bit stream by demodulating and decoding the baseband signal.

In addition, the wireless communication unit (210) up-converts the baseband signal into the radio frequency (RF) band signal to transmit it through the antenna, and down-converts the RF band signal received through the antenna into the baseband signal. To this end, the wireless communication unit (210) can comprise a transmit filter, a receive filter, an amplifier, a mixer, an oscillator, a digital-to-analog converter (DAC) and an analog-to-digital converter (ADC). And, the wireless communication unit (210) may include a plurality of transmission/reception paths. Furthermore, the wireless communication unit 210 may comprise one or more antenna arrays composed of a plurality of antenna elements.

In the respect of hardware, the wireless communication unit (210) can be composed of a digital unit and an analog unit; the analog unit can comprise a plurality of sub-units according to operating power, operating frequency, etc.; the digital unit can comprise at least one processor (e.g., a digital signal processor (DSP)).

The wireless communication unit (210) transmits and receives signals as described above. Accordingly, all or parts of the wireless communication unit (210) may be referred to as 'transmitter', 'receiver', or 'transceiver'. In addition, in the following description, the transmission and the reception performed through a wireless channel are used in the meaning of including the processes performed, as described above, by the wireless communication unit (210).

The backhaul communication unit (220) provides an interface for communication with other nodes in the network. That is, the backhaul communication unit (220) converts a bit string transmitted from the base station to another node—e.g., another access node, another base station, upper node, core network, etc.—into a physical signal, and converts a physical signal received from another node into a bit string.

The storage unit (230) stores the data such as basic program, application program, and setting information for the operation of the base station. The storage unit (230) may be configured as a volatile memory, a non-volatile memory, or a combination of volatile and non-volatile memories. In addition, the storage unit (230) provides the stored data according to the request of the control unit (240).

The control unit (240) controls overall operation of the base station. For example, the control unit (240) transmits and receives the signals through the wireless communication unit (210) or through the backhaul communication unit (220). And, the control unit (240) writes and reads the data in the storage unit (230). In addition, the control unit (240) may perform the functions of a protocol stack required by the communication standard. According to another implementation example, the protocol stack may be included in the wireless communication unit (210). To this end, the control unit (240) may comprise at least one processor. According to various embodiments, the control unit (240) may transmit a content-related command to the terminal. Here, the content-related command includes the information about the type, capacity, and storage time of the content to be stored in advance by the terminal. In addition, when the base station is in an overload state, it can transmit a message requesting to form a D2D link to the terminal that has entered the cell range of the base station. Through the formed D2D link, it can transmit a signal for the data transmission between adjacent terminals. For example, the control unit (240) may control the base station to perform the operations described later according to various embodiments.

FIG. 3 illustrates a configuration of a terminal in a wireless communication system according to various embodiments of this disclosure.

The configuration illustrated in FIG. 3 may be understood as a configuration of the terminal (120). The term ' . . . unit' or ' . . . er' used hereinafter refers to a device that processes at least one function or operation, which may be implemented through hardware, software, or a combination of hardware and software.

In FIG. 3, the terminal comprises a communication unit (310), a storage unit (320), and a control unit (330).

The communication unit (310) performs the functions for transmitting and receiving signals through a wireless channel. For example, the communication unit (310) converts a baseband signal and a bit stream according to the physical layer standard of the system. When transmitting the data, the communication unit (310) generates complex symbols by encoding and modulating the transmitted bit stream. Meanwhile, when receiving the data, the communication unit (310) restores the received bit stream by demodulating and decoding the baseband signal. In addition, the communication unit (310) up-converts the baseband signal into the RF band signal to transmit the signal through the antenna, and down-converts the RF band signal received through the antenna into the baseband signal. The communication unit (310) may comprise a transmit filter, a receive filter, an amplifier, a mixer, an oscillator, a DAC, and an ADC.

The communication unit (310) may also comprise a plurality of transmission/reception paths. Furthermore, the communication unit (310) may include at least one antenna array composed of a plurality of antenna elements. In terms of hardware, the communication unit (310) may include a digital circuit and an analog circuit (e.g., a radio frequency integrated circuit (RFIC)). Here, the digital circuit and the analog circuit may be implemented as one package. Also, the communication unit (310) may comprise a plurality of RF chains. Furthermore, the communication unit (310) may perform the beamforming.

And, the communication unit (310) may comprise different communication modules to process the signals of different frequency bands. Furthermore, the communication unit (310) may include a plurality of communication modules to support a plurality of different wireless access technologies. For example, different wireless access technologies may include Bluetooth low energy (BLE), Wireless Fidelity (Wi-Fi), WiFi Gigabyte (WiGig), cellular network (e.g., Long Term Evolution (LTE), etc.). And, the different frequency bands may include the super high frequency (SHF) (e.g., 2.5 GHZ, 5 GHZ) band and the millimeter wave (e.g., 60 GHz) band.

The communication unit (310) transmits and receives the signals, as described above. Accordingly, all or parts of the communication unit (310) may be referred to as 'transmitter', 'receiver', or 'transceiver'. In addition, in the following description, the transmission and the reception performed through a wireless channel are used in the meaning of including processes performed, as described above, by the wireless communication unit (310).

The storage unit (320) stores the data such as basic program, application program, and setting information and contents for the operation of the terminal. The storage unit (320) may be configured as a volatile memory, a non-volatile memory, or a combination of volatile and non-volatile memories. In addition, the storage unit (320) provides the stored data according to the request of the control unit (330).

The control unit (330) controls the overall control operation of the terminal. For example, the control unit (330) transmits and receives the signals through the communication unit (310). And, the control unit (330) writes and reads the data in the storage unit (320). In addition, the control unit (330) may perform the functions of a protocol stack required by the communication standard. To this end, the controller (330) may comprise at least one processor or microprocessor, or become a part of a processor. The part of communication unit (310) and the control unit (330) may be referred to as a communication processor (CP). According to various embodiments, the control unit (330) may receive a request message from the base station and store the specific content in response to the received request message. The content may be stored in a non-overload cell, and the content data may be transmitted from a base station. After entering the overload cell, it may form a D2D link between adjacent terminals according to the request message from a base station, and may directly or indirectly receive a request from other adjacent terminal to share the request content with the other terminal. For example, the control unit (330) may control the terminal to perform the operations according to various embodiments to be described later.

FIG. 4 illustrates an integrated structure for the mobile caching in a wireless communication system according to various embodiments of this disclosure.

In order to realize the present invention, the individual functions are performed in the base station and the terminal. In addition, various pieces of information to support this may be provided by the network. The network may include the core network (CN).

The network may comprise a content source unit and an information server unit.

The content source unit can receive the original content from the outside or may generate it. The content source unit may comprise a file server and a fountain coding encoder.

The fountain coding encoder can encode the original content by dividing it into segments. It may further comprise a device for storing the encoded output values. The file server provides the original content to the fountain coding encoder.

The information server unit may comprise a content server unit. In order to provide the external information for the storage of spatiotemporal content in the D2D communication terminal, the user's traffic load record, mobility information (movement pattern), preference distribution for each content, etc. should be analyzed and managed by a separate server, which may be referred to as a content server unit. The content server may be included in the information server unit or be a separate component that is electrically connected to the information server unit to exchange data.

The information server unit also manages the user and service information. In FIG. 1, the content source unit and the information server unit work with each base station, which cooperates with a terminal to perform the content pre-storing and transmitting function.

Each base station selects and performs the content pre-storing or transmitting step according to whether there is an overload, during which a cache management function is performed for determining whether to overload and what function to perform is implemented. And, in the base station which is not overload, a determination is made as to which content to be stored in each terminal by the content placement function. According to the result, the processing and transmission for storing the corresponding content in the terminal are performed by the payload processing and delivery control function. Meanwhile, in the overload base station, the content steering function is performed for resolving the storage state mismatch in each terminal.

The terminal implements a payload processing function that processes a payload by pre-storing necessary content or searching for pre-stored content. And, for this purpose, a content placement function to store the processed content in the storage unit and a delivery control function to perform the processing of content required for transmission by searching it in the storage unit are implemented.

FIG. 5 illustrates a base station configuration for a mobile caching in a wireless communication system according to various embodiments of this disclosure.

The base station for implementing a mobile caching in this disclosure may comprise various components in addition to those of the base station disclosed in FIG. 2. More specifically, the following processing devices may be used to perform a mobile caching function or to allow the terminals in the cell of a base station to perform a mobile caching function.

It may include an interface module, a payload processing unit, a traffic load management unit, a cache management unit, a local caching optimization unit, a content retrieval unit, a content delivery control unit, a steering optimization unit, a mismatch analysis unit, a feedback processing unit, a multicast processing unit and a channel de-multiplexing unit.

FIG. 6 illustrates a terminal configuration for a mobile caching in a wireless communication system according to various embodiments of this disclosure.

In this disclosure, the terminal for implementing a mobile caching may include various components in addition to the those of the base station in FIG. 2. More specifically, the following processing devices may be used to perform the mobile caching function independently or to perform it by receiving a signal from the base station.

It may include a payload processing unit, a content delivery unit, a content retrieval unit, a feedback unit, a caching status processing unit, a content placement unit, a content processing unit, and a local content placement unit.

FIG. 7 illustrates an operation of a terminal for a mobile caching in a wireless communication system according to various embodiments of this disclosure.

When the mobile terminal according to an embodiment of this invention is in a cell that is not in an overload state (off-peak hour), each terminal can periodically perform a procedure to share its state information with the core network. Alternatively, the status information may be shared by requesting as needed in units of each terminal. Here, the state information should be understood to include the storage space, storage state, preference, battery, D2D communication-related information of each terminal.

The network may perform a procedure to determine which and how much content each terminal should store according to the reception of the status information. At this time, the procedure can be arbitrarily determined based on all information in the core network (centralized placement determination). Alternatively, a distributed placement determination may be made between base stations. The content may be stored in a storage space of the terminals using the determined storage method.

When the cell becomes overload (peak hour), it can reduce the load accessing from the base station by sharing necessary information of content pre-stored in each terminal with neighboring terminals through the D2D link.

When a terminal needs a specific content, it checks first whether the corresponding content is stored in the storage device of the terminal. Once confirmed that there is no such content, it requests nearby terminals to send the necessary content through D2D communication.

In order to receive the corresponding content through D2D communication, it may perform a contents discovery process to obtain the information on what kind of and how much content the nearby terminals have. After performing this process, a content delivery procedure may be performed using D2D resources.

The steps of the above process can be explained as follows:

During the period in which the cell is in a non-overload state, each terminal periodically updates its own state information in step 710. The updated status information may be transmitted to the core network or be shared with the base station or other terminals.

In step 730, a procedure is performed to determine the content to be stored in the storage unit of the terminal. This procedure may be performed independently in the core network or distributedly by a plurality of base stations. The information on the stored content may include the information on content type, content storage capacity, content size and content storage time.

In step 750, it carried out the cell-specific content storage according to the determined storage method. The content storage command may be delivered to the base stations by the core network.

During the period when the cell is overload,

In step 770, the base station may transmit the content in response to a content transmission request received from each of the base stations belonging to the cell. However, there may be the cases in which the transmitted data is not sufficient to reproduce the content in an overload state.

In step 790, a D2D link is formed between a plurality of terminals belonging to the overload cell to share the necessary information between neighboring terminals. In this case, the shared information may be the shortage of content that has not been transmitted from the base station due to overload of the cell. Therefore, each terminal checks whether the corresponding content is already stored in its storage unit and, if it is stored, checks whether the data is sufficient to reproduce the content. If the amount of data is insufficient, the terminal transmits a content transmission request signal to neighboring terminals through the formed D2D communication link. Thereafter, the content delivery procedure is performed.

Meanwhile, in step 791, a content discovery process may be performed. In order to receive the content through D2D communication, it is necessary to check what kind of and how much content the nearby terminals have. The corresponding information can be received through the content discovery process. In step 793, each terminal that has requested the content may receive the corresponding content by utilizing the D2D resource.

FIG. 8 illustrates a relationship between terminals belonging to a specific cell in a wireless communication system according to various embodiments of this disclosure.

In FIG. 8, the set of user terminals (801) is defined as $\mathcal{D}=\{1, 2, 3, \ldots, n\}$, the storage size of terminal i is $M_i$, i∈ $\mathcal{D}$ the normalized relative traffic intensity of the user terminal i is $$s_i \Rightarrow \sum_{i \in \mathcal{D}} s_i = 1,$$

the content preference index of the user terminal i for the file f is $$w_{i,f} \Rightarrow \sum_{f \in \mathcal{F}} w_{i,f} = 1,$$

the cache memory size of D2D device i is $M_i$, the probability that the D2D device i is located in the base station b at time t is $h_i^{(b)}(t)$, the aggregate cache size according to the transition from the base station b to the base station b' is $Q_{b,b'}(t)$, and the aggregate cache size of the base station b is $M^{(b)}(t)$, the maximum distance (803) between terminals in which a D2D link can be formed is $R_{D2D}^{(b)}$, and the radius (830) of a specific cell is $R_{cell}^{(b)}$.

Here, a terminal with the D2D communication function may also be referred to as a D2D terminal or a D2D device.

Each terminal has its own storage space, content preference, and traffic intensity, and the core network can acquire such information through a pre-procedure.

$$q_f^{(b)}(t) = \sum_{i \in \mathcal{D}} s_i w_{i,f} h_i^{(b)}(t) \qquad \text{[Equation 1]}$$

FIG. 9 illustrates the content preference for each cell in a wireless communication system according to various embodiments of this disclosure.

FIG. 10 illustrates the classification of overload and non-overload cells in a wireless communication system according to various embodiments of this disclosure.

In FIG. 9 and [Equation 1], the aggregated preference for each content in a specific base station at a specific time is obtained with the aggregated content preference model, where the preference of the relevant content is multiplied by the traffic intensity of each user moving to the base station by weight, which are averaged then.

The mobility model of MoCaNet is classified into the long-term STO (spatio-temporal offloading) level that reflects the inter-cell movement pattern and the short-term STO level that considers the caching pattern according to the movement speed of each D2D terminal within an overload cell. The different models are applied to them according to their hierarchical level.

At the long-term STO where the inter-cell mobility of each terminal is reflected, the cell load can be determined by their movement patterns, and a cell in which the content load requested by the user at a specific time exceeds a threshold can be defined as an overload cell. Assuming that there are B base stations in the system, the index set of each base station may be represented as $\mathcal{B}=\{1, 2, 3, \ldots, B\}$. As shown in the example of FIG. 10, the index set of the base station corresponding to each overload cell may be expressed as $\mathcal{B}_o (\mathcal{B}_o \subset \mathcal{B})$.

FIG. 11 illustrates the mobility model for each cell of the terminals forming a D2D link in a wireless communication system according to various embodiments of this disclosure.

The mobility of each D2D terminal is given as a transition probability between base stations according to time, as shown in FIG. 11, with which the probability for each terminal to arrive at a specific base station at a specific time can be calculated. FIG. 11 illustrates a situation where two users move across three base stations. In this case, the STO optimization according to a terminal-unit mobility model may require an ultra-high level of complexity in real-time calculation.

FIG. 12 illustrates an aggregated flow model for each cell of terminals forming a D2D link in a wireless communication system according to various embodiments of this disclosure.

In the example of FIG. 12, a new structure that can realistically handle this is presented. More specifically, a cell-by-cell aggregated flow model is proposed as a spatiotemporal integration model that defines the mobility by grouping the flows of terminals moving in the same path. With this model, each base station can determine the content storage probability for each D2D terminal so as to maximize the average offloading gain of the overload cell throughout the system.

The combined size of the cache memory of the terminals in the cell of the base station b is given by $$M^{(b)}(t) \Box \sum_{i \in D} M_i h_i^{(b)}(t) = \sum_{b' \in \mathcal{L}(b)} Q_{b,b'}(t),$$

where the number of segments corresponding to the file f $N_f^{(b)}(t)$ must be smaller than $M^{(b)}(t)$ ($N_f^{(t)}(t) \leq M^{(b)}(t)$).

In this condition, the following segment conservation law is established according to cell-to-cell movement of the terminal:

$$N_f^{(b')}(t+1) = \sum_{b \in \mathcal{B}} Q_{b,b'}(t) \left\{ p_f^{(b)}(t) + \frac{N_f^{(b)}(t)}{M^{(b)}(t)} \right\}, \ b' \in \mathcal{L}(b) \quad \text{[Equation 2]}$$

FIG. 13 illustrates a change in the number of segments according to cell-to-cell movement of a terminal in a wireless communication system according to various embodiments of this disclosure.

In FIG. 13 and [Equation 2], the objective function is defined as the average number of segments of all contents to be transmitted through the wireless access link in all overload cells of the entire system at a specific time.

$$S(p_f^{(b)}(t)) = \sum_{b' \in \mathcal{B}_o(t)} \sum_{f \in F} q_f^{(b')}(t+1) \left[K_f - N_f^{(b')}(t+1)\overline{D}_{D2D}^{(b')}\right]^+,$$

$$b \in \mathcal{B}_o(t)$$

$$= \sum_{b' \in \mathcal{B}_o(t)} \sum_{f \in F} q_f^{(b')}(t+1)[K_f -$$

$$\overline{D}_{D2D}^{(b')} \sum_{b \in \mathcal{B}} Q_{b,b'}(t) \left\{ p_f^{(b)}(t) + \frac{N_f^{(b)}(t)}{M^{(b)}(t)} \right\} \bigg]^+$$

The average number of segments of all contents to be transmitted through the wireless access link in all overload cells of the whole system at a specific time is called the load of the wireless access link. There can be raised an optimization problem to determine the storage probability $p_f^{(b)}(t) \in [0,1]$ for each content in all D2D terminals can be established so as to minimize the load of the wireless access link, and this is expressed as follows:

$$\min_{p_f^{(b)}(t)} S(p_f^{(b)}(t)) \ \text{such that} \ \sum_{f \in F} p_f^{(b)}(t) \leq 1, \ b \in \overline{\mathcal{B}}_o(t)$$

FIG. 14 illustrates a method to store the content in a terminal performing the mobile caching in a wireless communication system according to various embodiments of this disclosure.

When the procedure for determining the content to be stored in the storage unit included in the terminal is performed, the procedure may be performed independently in the core network or distributedly by a plurality of base stations. The information on the stored content may include the information on content type, content storage capacity, content size and content storage time.

The storage content determination method independently performed in the core network is referred to as the centralized placement determination.

Since the optimization problem of $$\min_{p_f^{(b)}(t)} S(p_f^{(b)}(t))$$

such that $$\sum_{f \in F} p_f^{(b)}(t) \leq 1, \ b \in \overline{\mathcal{B}}_o(t)$$

is not a convex one, it can be converted to a convex problem by approximating the objective function as follows:

$$S(p_f^{(b)}(t)) \approx \sum_{b' \in \mathcal{B}_o(t)} \sum_{f \in F} \frac{q_f^{(b')}(t)}{g} \log\left( \exp\left(g - g\frac{\phi_f^{(b')}(t)}{K_f} \overline{D}_{D2D}^{(b')}\right) + 1 \right)$$

Since the given problem is a convex optimization one with a constraint, the optimal solution can be obtained for it in the projected gradient method, and the gradient for $S(p_f^{(b)}(t))$ is as follows:

$$\frac{\partial S}{\partial p_f^{(b)}(t)} = -\sum_{b' = \mathcal{B}_o(t)} \frac{q_f^{(b')}(t) \overline{D}_{D2D}^{(b')} e^g (\phi')_f^{(b')}(t)}{K_f \exp\left(\frac{\overline{D}_{D2D}^{(b')}}{K_f} \phi_f^{(b')}(t)\right) + e^g}$$

When the constraint set is $$C = \left\{ p_f^{(b)}(t) \middle| \sum_{f \in F} p_f^{(b)}(t) \leq 1, \ b \in \overline{\mathcal{B}}_o(t) \right\},$$

the algorithm is given as follows, where $P_C[\bullet]$ is the projection operation on C:

---

Algorithm 1 Centralized STO Algorithm

1:   Initialize k = 1, $(p_f^{(b)}(t))^{(0)} = 0$ for $\forall b \in \tilde{\mathcal{B}}_o(t)$
2:   repeat
3:     for $\forall b \in \tilde{\mathcal{B}}_o(t)$ do
4:       Compute $(\tilde{p}_f^{(b)}(t))^{(k)} = (p_f^{(b)}(t))^{(k-1)} +$
5:       $t_k \sum_{b' \in \mathcal{B}_o(t)} \frac{q_f^{(b')}(t) \overline{D}_{D2D}^{(b')} \phi_f^{(b')}(t)}{K_f \exp\left(\overline{D}_{D2D}^{(b')} K_f \phi_f^{(b')}(t) - g\right) + 1}$

| Algorithm 1 Centralized STO Algorithm |
| --- |
| 6:     end for |
| 7:     Projection onto $\mathcal{C}$ as $(p_f^{(b')}(t))^{(k)} = \mathcal{P}_\mathcal{C}[(\hat{p}_f^{(b')}(t))^{(k)}]$ |
| 8:     k → k + 1 |
| 9: until convergence criterion is met. |

The storage content determination method performed distributedly by a plurality of base stations is referred to as the distributed method.

In the centralized method, all information is collected from the core network to obtain the solution at once and deliver it to all base stations. When the system gets bigger, it becomes more complex to implement the method. So, is proposed the distributed method that enables the base stations in the system to find solutions distributedly based on ADMM (alternating direction method of multipliers) simply through the message delivery. Its system model is the same as that of centralized method, but there is a difference in the subject and algorithm to find the solution.

First, the solution obtained by the base station b just by reflecting the information about its own situation may be defined as $P_b \in [0,1]^{F|\tilde{B}^{(n)}| \times 1}$, where $P_b = [(p_b(1))^T (p_b(2))^T \ldots (p_b(F))^T]^T$ and $p_b(f) = [p_{b,f}^{(1)} \ p_{b,f}^{(2)} \ldots p_{b,f}^{(|\tilde{B}^{(n)}|)}]^T$.

And the consensus variable Z is defined. This variable can make the obtained result values converge to the same value.

When defining $$F^{(b)}(p_b) = \sum_{f \in F} \frac{w_f^{(b)}}{K_f} \left[ K_f - D_{\text{Off}}^{(b)} \sum_{b_i \in \tilde{B}^{(n)}} G_{b_i,b} P_{b,f}^{(b_i)} \right]^+,$$

the problem can be transformed into:

$$\min_{z, \{p_b\}_{b \in \tilde{B}^{(o)}}} \sum F^{(b)}(p_b) + g(z)$$

$p_b - z = 0$ for $\forall b \in \tilde{B}^{(o)}$. Here, g(z) is a penalty function, which can be expressed as:

$$g(z) = \begin{cases} 0 & \text{if } z \in C \\ \infty & \text{otherwise} \end{cases}, C = \left\{ z \in R_+^{F|\tilde{B}^{(n)}| \times 1} \middle| \sum_{f \in F} Z_f^{(b)} \leq 1 \text{ for all } b \in \tilde{B}^{(n)} \right\}$$

$$C = \left\{ z \in R_+^{F|\tilde{B}^{(n)}| \times 1} \middle| \sum_{f \in F} z_f^{(b)} \leq 1 \text{ for all } b \in \tilde{B}^{(n)} \right\}$$

In FIG. 14 and [Equation 3], the distributed solution is calculated as follows, and all the base stations transmit $P_b^{k+1}$ and $y_b^{k+1}$, which they have obtained, to neighboring base stations and $z^{k+1}$ is calculated based on the collected information. Once $z^{k+1}$ is calculated, $P_b^{k+1}$ and $y_b^{k+1}$ can be re-calculated, which is repeated until the values converge.

[Equation 3]

$$p_b^{k+1} = \underset{p_b}{\operatorname{argmin}} \underbrace{\left( F^{(b)}(p_b + y_b^k(p_b - z^k) + (\rho/2) \| p_b - z^k \|_2^2 \right)}_{\text{Objective function} \quad \text{Augmented Lagrangian}}$$

Contents placement by BS b $$z^{k+1} = \prod_C (\overline{p}^{k+1} + (1/\rho) \overline{y}^{k+1})$$

Dual variable for consensus among BSs $$y_b^{k+1} = y_b^k + \rho(p_b^{k+1} - z^{k-1})$$

| Algorithm 2 Proposed ADMM Algorithm |
| --- |
| 1: Initialize $z^0 = 0$, $y_b^0 = 0$, $p_b^0 = 0$ for $\forall b \in \tilde{B}^{(o)}$ |
| 2: repeat |
| 3:     for b=1:$|\tilde{B}^{(o)}|$ do |
| 4:         Compute $y_b^{k+1}$ using (20) and $p_b^{k+1}$ using (21) |
| 5:         Each BS broadcast $y_b^{k+1}$ and $p_b^{k+1}$ |
| 6:     end for |
| 7:     Individually updates $z^{k+1}$ for $\forall b \in \tilde{B}^{(o)}$ |
| 8: until convergence criterion is met. |

FIG. 15 illustrates another method for storing the content in a terminal performing the mobile caching in a wireless communication system according to various embodiments of this disclosure.

The optimal solution can be distributedly obtained with Algorithm 2 but, if the system is too large to actually solve it, another heuristic method can be used.

More specifically, it is a method of defining the mobility of each base station for each time zone and distributing the excess load to the base stations in a time zone with a low load so that the average offloading gain of the overload cell can be maximized based on the movement patterns of terminals between the base stations.

$$\underbrace{c_j^{(n)}}_{\substack{\text{Extra Demand} \\ \text{(to be served} \\ \text{by the previous BS)}}} = \max\left( \underbrace{d_j^{(n)}}_{\text{Demand}} + \underbrace{\sum_k x_{jk}^{(n+1)}}_{\substack{\text{Demand} \\ \text{carried over}}} - \underbrace{s_j^{(n)}}_{\text{Supply}}, 0 \right) \quad \text{[Equation 4]}$$

$$x_{ij}^{(n)} = \underbrace{c_j^{(n)} t_{ji}^{(n)}}_{\text{Absolute offload}} + \min\left( f_i(c_j^{(n)}) + \delta\left( \sum_{ij} c_j^{(n)} \right) \cdot \left( \gamma s_j^{(n)} - f_i(c_j^{(n)}) \right), \gamma s_j^{(n)} \right)$$

$$\text{where } f_i(c_j^{(n)}) = \max\left( s_i^{(n-1)} - \left( d_i^{(n-1)} + \sum_j c_j^{(n)} t_{ij}^{(n)} \right), 0 \right) \times \frac{c_j^{(n)} t_{ij}^{(n)}}{\sum_j c_j^{(n)} t_{ij}^{(n)}}$$

In FIG. 15 and [Equation 4], the goals can be to define the demand and the supply for each base station and to determine the load stored in each base station in time and space so that the demand does not exceed the supply according to the standard of time to be observed (e.g., 1 hour). Let the excess demand of the base station j at the n-th time be $c_j^{(n)}$. Then, the load $x_{ij}^{(n)}$ that this excess demand is distributed to the base station i according to the transition probability matrix can be obtained by Equation (4) in a distributable manner.

FIG. 16 illustrates a process in which the mobile caching is performed in a wireless communication system according to various embodiments of this disclosure.

A terminal according to various embodiments of this disclosure has a D2D communication function and a storage unit capable of caching the content.

A base station according to various embodiments of this disclosure performs a wireless access function and a mobility management function for a terminal to access a network, and forms a cellular mobile communication system together with the terminal.

The base station may be connected to a network to receive a signal from it. This network may be referred to as a core network. The content may be transmitted between terminal and base station or between terminal and terminal, and the commands related to the content transmission may be transmitted through the network. The content may be supplied through a content server included in the network. At this time, the supplied content may be encoded with a fountain code in advance, stored in the content server, and then transmitted to a base station or a terminal according to the request.

The core network may create a file library in each base station for the separate storing of frequently requested main contents among those stored in the content server.

A frequently requested main content may be referred to as a preferred content of the terminal, and whether the content is a preferred one or not may be determined according to the pre-set content preference value. The information on the content preference belongs to the state information of the terminal, which may be periodically updated to the base station from each terminal. The base station may share the corresponding state information with other terminals, base stations, or networks.

The information about the content request signal from the terminal may be stored in a file library and used to update the content preference value. The file library may be updated system-wide when necessary. In this case, the content preference values of all terminals belonging to a specific cell are also updated. In addition, the content information regarding the request time or date for specific content and the capacity of the content may be updated too.

Meanwhile, when there is room in wireless access capacity, the mobile terminals sojourning in the corresponding cell through each base station may store the contents in advance in consideration of future movement conditions.

The term "when there is room in wireless access capacity" comprehensively refers to a 'non-peak hour' when data transmission and reception between base station and terminal is not so difficult due to overload of the cell.

More specifically, it may include all the cases in which user terminals are not congested in a specific cell during a specific time period. And the pre-storing of the content is a process to store in the terminal in advance the specific content expected to request its transmission during the 'peak hour' to prepare for the case that the data transmission is not performed smoothly from the base station at the peak time.

When these terminals are entering a cell with insufficient wireless access capacity in the future, it can prepare for the overload situation of the cell by providing the stored content through the D2D communication link according to the request of the surrounding.

At this time, as described above, a cell with insufficient wireless access capacity refers to the one that the data transmission between base station and terminal becomes difficult in it. That is, it may be the same concept as 'peak hour.'

When the terminal requests a specific content during a peak hour, it also becomes difficult to receive the desired content at the desired time due to overload. If a nearby terminal stores the corresponding content in advance, it can transmit/receive the specific content by forming a D2D communication link between the terminals.

To this end, the terminal should have a caching capability to temporarily store specific contents in advance. By maximizing this caching capability to lower the wireless connection load of the mobile communication network, the wireless data can be transmitted more smoothly regardless of time zone.

In the mobile communication system according to various embodiments of this disclosure, the network operating method may comprise a process to store the content in advance. in a corresponding terminal before the terminal enters an overload cell, and a process to transmit the content according to the transmission request after the terminal enters the overload cell.

In order to perform the pre-storing process, it is necessary to first pre-estimate base stations to be overload at a specific time in consideration of the terminal mobility. The overload cell information can be pre-estimated by identifying the mobility or movement pattern of the terminals. Here, the overload cell information includes the information on when and where an overload cell occurs according to the movement of the terminals.

In addition, not only the mobility or movement pattern of the terminals but also the size of the storage device of each terminal and the distribution of preference for contents predetermined for each terminal in the system may be considered.

At this time, the mobility or movement pattern of the terminals may be obtained by directly or indirectly inferring the statistics on individual's movement path. For example, by collecting and processing the information on how long each terminal sojourns in a specific cell, it can determine when and how long it remains in the cell and, based on this, can infer a movement path between each cell. As an indirect analogy method, it may analyze SNS information or user input information. It can also measure the request frequency for each content in the system to generate the preference distribution for each content. For example, it can assume a Zipf distribution for the modeling.

Through the mobility information of the terminal, it can obtain the information about the location of overload cell, the time of occurrence, and the duration the terminal remains in the overload cell; it can also obtain the content information about what content to be stored in which terminal in how much amount through the terminal user's SNS information, the storage device capacity of the terminal, or the frequency of request for each content.

This pre-storing process can be performed in all base stations that have not been overloaded. The pre-storing process is performed based on the above-described content information and the mobility information of the terminal, through which the terminal storing the content comes to be at a specific location according to the estimated movement pattern. If the terminal enters an overload cell, the content delivery process is performed.

In the content delivery process, the terminal uses the content that has undergone the pre-storing process. But, as the pre-storing is performed based on a given mobility model (predicted movement pattern), the pre-stored situation may be different from the target value at the actual assessable terminal due to the uncertainty of terminal mobility. In order to respond to the discrepancy situation of the pre-storage, an additional content steering process to adjust the storage state in the caching can be performed simultaneously during the delivery process. As such, the last stage of storage or placement function in the content delivery process is to adjust the mismatching of the stored content with the actual situation by immediately responding to the discrepancy.

The content delivery process may be performed when the terminal enters an overload cell.

When a terminal located in an overload cell requests a necessary content, the core network that has received the content request signal through the base station starts the content delivery procedure.

According to an embodiment of this disclosure, the terminal first checks whether the desired content is already stored in its storage unit. If the entire content file is already stored in its storage unit, the terminal uses the stored content. On the other hand, if the desired content is stored just partly or not at all, the deficient data of content should be transmitted from the nearby terminal through the D2D communication link. Nevertheless, if all necessary content cannot be secured, the rest can be transmitted from the base station through the wireless access link.

At this time, the terminal determines what content it wants, and sends the information about the content type, the total capacity of content, the capacity of required content, the total storage capacity of terminal, the capacity that the terminal can currently receive to the base station. When a D2D communication link has already been established, it may transmit the information to neighboring terminals. Or, it may use the base station to share the information with the core network or other base stations or other terminals belonging to the base station. Based on the information received from the terminal, the core network may give a content transmission command to the terminals belonging to the base station or cell, or a command to form a D2D communication link.

According to an embodiment of this disclosure, in the content delivery process, the terminal may acquire the information about the nearby terminals and the contents stored in the terminals. The information is referred to as the peripheral terminal information. The peripheral terminal information may include the transmission capacity of the terminals, the relative distance between the content requesting terminal itself and the peripheral terminals, and the transmission performance of the peripheral terminals. A content discovery procedure may be additionally performed in order to acquire peripheral terminal information. The content discovery procedure may be divided into the cases with and without a tracker, which is a unit for tracking the information on what contents the terminals are storing in a network. At this time, the tracker should be comprehensively understood as including all information about the above-described peripheral terminal information or content, as well as the type of content stored by terminals in the network.

FIG. 17 is a flowchart illustrating a process in which the mobile caching is performed in a wireless communication system according to various embodiments of this disclosure.

FIG. 17 is an embodiment of the message transmission/reception procedure required in this invention. In the content storage process, a procedure of obtaining the information on the status of the terminal (UE status update) may first be performed between the terminal and the core network.

The information obtainable in this process includes the information on the storage capacity of terminal, the current storage state, the content preference, the battery state, the D2D communication function, and the mobility of terminal. The network may request only the necessary information among the corresponding information, or may request the information delivery only to specific terminals. Based on the relevant information, the core network may determine what content to store in the terminals and may perform content delivery for the content storage. At this time, the determination about what content to store may be made by the network, or by the base stations in a distributed manner.

FIG. 18 is a flowchart illustrating a content discovery procedure using a tracker in a wireless communication system according to various embodiments of this disclosure.

Only if a tracker exists, the terminals may follow the procedure of FIG. 18, periodically acquiring the information on what terminals exist in the vicinity through the existing D2D discovery procedure. That is, the terminals may obtain the information including UE ID. When a terminal (UE1) requests a specific content, the terminal may transmit the information about nearby terminals (UE IDs) and the desired content information (Contents ID) to the base station and the core network. At this time, the tracker may be a component of the core network. After collating the corresponding information, the tracker may deliver to the base station the information about what terminals are storing the corresponding content in what amount. Then, the base station schedules a wireless resource to the terminal based on the received information, and the terminal receives the scheduled content through D2D communication.

FIG. 19 is a flowchart illustrating the content discovery procedure based on a receiver in a wireless communication system according to various embodiments of this disclosure.

FIG. 20 is a flowchart illustrating the content discovery procedure based on a sender in a wireless communication system according to various embodiments of this disclosure.

The terminal without a tracker should obtain the information about the nearby terminals and about the contents stored in them in a distributed manner by itself.

This may be further divided into two: the receiver-initiated content discovery method and the transmitter-initiated contents discovery method.

In FIG. 19, the receiver-initiated content discovery is a method of content discovery in which the terminal receiving the content requests the scheduling from a base station.

The station performs a D2D discovery procedure by periodically sending the discovery message to the terminals with the content storage state information about the contents the terminals have. Accordingly, the terminal can track what terminals exist around it and what contents they are storing. When a terminal desires a specific content, it can check the corresponding information through the D2D discovery procedure, so directly request the scheduling to the base station.

In FIG. 20, the sender-initiated content discovery is a method of content discovery in which the terminal delivering the content requests the scheduling from a base station.

When a terminal transmits the discovery message, it may include the information on the content desired by itself in the discovery message to perform a D2D discovery procedure. This is an on-demand discovery method, and the terminals that do not want the content need not perform the D2D discovery procedure. The terminals which received the discovery message check whether they have the corresponding content in their storage unit. The terminals storing the content may report to the base station that they have the content desired by the target terminal, and the base station may schedule the D2D resource so that the target terminal can perform the offloading through the D2D communication.

FIG. 21 illustrates an operation of the delivery adjustment procedure in a wireless communication system according to various embodiments of this disclosure.

For the content steering, each terminal periodically reports the status (stored amount) of its contents to the base station. On the other hand, the base station determines in advance the target contents that the terminals currently staying in the base station should store, and then analyzes what terminals have the mismatching information on what contents to what extent by comparing them with the situation reported from the terminals. When determining the target level of content to be stored by each terminal, it can perform a form of optimization similar to that in the pre-storing step. In this process, the discrepancy analysis according to the report of the terminal is mainly carried out for the contents belonging to the file library. In consideration of the analysis result and the distribution of requests for the contents at the same time, the scheduling is performed to determine what content to be filled in what terminal and, according to the result, a procedure of transmitting the corresponding content to the corresponding terminal is performed. FIG. 4 illustrates a content steering process through the state information reporting and the discrepancy analysis. In order to prevent additional wireless access capacity in the content steering process of the overload cell, the steering is performed based on two types of transmission methods.

The unicast-based steering is a method in which, when the base station transmits a content requested by a terminal, it allows other necessary terminals to receive it. To this end, it needs to notify them about what terminal should receive the corresponding content and what content should be deleted from the storage unit to store the received content. For this purpose, the receiver group information is transmitted through the control channel.

In the multicast-based steering, the terminal transmits the content to be stored through a separate multicast channel and, at this time, sends the determination about what terminal should store what content through a control channel.

Meanwhile, there also is a method in which the terminal does not report the storage state periodically but the base station broadcasts the target storage state value and transmits it to the terminal, and the terminal stores the necessary content based on this value. For this, it needs a way of transmitting the state value from the base station to all or specific terminals as well as a way of delivering the content to be stored to the terminals. In this case, for the way of delivering the content to be stored, both unicast-based coordination and multicast-based coordination can be considered as before.

According to an embodiment of this disclosure, the unicast-based steering may be implemented. When the terminals enter the overload cell with the contents in their storage unit, the overload base station may perform a steering procedure to maximally prevent the performance degradation caused by the uncertainty and randomness of mobility of the terminals.

First, it is assumed that the content request model of the terminals follows a Poisson distribution, and the average arrival rate is different for each terminal. More specifically, the arrival rate of terminal i is assumed as $\lambda_i$. This may reflect that the degree requesting the content may be different for each terminal.

When an arbitrary terminal i enters the base station at time t, the mean sojourn time staying in the relevant station is defined as $s_i(t)$. The corresponding information of the terminal i is assumed to have already been received by the network or the base station prior to its entry. And $x_{i,f}$ is defined as a value indicating how many segments of content f the terminal i has in its storage unit. The terminal i adjusts or steers its content storage state $x_{i,f}$ with $c_{i,f}$ according to the instruction of the base station. Here, $c_{i,f}$ may be defined as the optimal caching storage method in the current state for the terminal i determined by the base station.

The number of segments of content f scheduled to deliver to current terminals is defined as $s_f$. In the unicast-based steering, up to $s_f$ segments can be adjusted for the content f. Therefore, the unicast steering problem can be formulated as:

$$\min_{c_{i,f}} \sum_f \sum_i (1 - e^{-\lambda_i T}) q_{i,f}(t) \frac{s_i(t)}{T} \max\left(k_f - c_{i,f} - D_{D2D} \frac{s_j(t)}{T} \sum_{j \neq i} c_{j,f}, 0\right)$$

subject to $c_f = \max_{\forall i}(c_{i,f} - x_{i,f})$ $c_f \leq s_f$ $\sum_f c_{i,f} \leq M_i$ $c_{i,f} \leq k_f$ The above is a Mixed Integer Non-linear Programming problem, and a suboptimal solution can be obtained for it through the greedy algorithm.

FIG. 22 is a flowchart illustrating an operation of the core network in a wireless communication system according to various embodiments of this disclosure.

In the step 2201, the core network receives the location information of the terminal, and determines the content to be stored in the terminal based on the received location information of the terminal. The location information of the terminal includes the information about the mobility or movement pattern of the terminal. Through this, the network can predict the location of the terminal in the future and, based on this, it can estimate when and where an overload cell occurs. It can also determine the type of content to be stored, the storage time, etc. based on the estimated value of the overload cell as well as the preference of a specific content and the reproduction record of the terminal user.

In the step 2203, the core network determines whether the cell to which the current terminal belongs is an overload cell by considering the traffic condition of the cell to which the terminal belongs, the current content transmission speed, and the number of terminals currently being transmitted.

In the step 2205, the content storage procedure is performed for a terminal if the cell to which the terminal currently belongs is not overload. According to the content information determined in the step 2201, the core network may give a content transmission command to the base station. Then, the base station transmits the corresponding content to the terminal in response to the content transmission command. The terminal receiving the corresponding content can store the content in its storage unit. As being done before entering the overload cell, it is called a pre-storing step.

In the step 2207, when the cell to which the terminal belongs turns out to be overload, the terminal may perform a content delivery procedure with adjacent terminals. To this end, the core network may form a D2D communication link between the terminal and its adjacent terminals. The core network may independently determine to form a D2D communication link according to information received from the terminal or the base station, or may allow it to form the link by transmitting a grant message after receiving a request signal from the terminal or base station. Alternatively, the terminal or the base station may determine to form a D2D communication link according to its own determination. Once the D2D communication link is established, a content delivery procedure is performed with an adjacent terminal according to the request of the specific terminal. In this case, the pre-placed content may be transmitted/received.

FIG. 23 is a flowchart illustrating an operation of the base station in a wireless communication system according to various embodiments of this disclosure.

In the step 2301, the base station receives the location information of terminal. The location information of terminal includes the information about the mobility or movement pattern of the terminal. Through this, it can predict the location of the terminal in the future and, based on this, can estimate when and where an overload cell occurs. It can also determine the type of content to be stored, the storage time, etc. based on the estimated value of the overload cell as well as the preference of a specific content and the reproduction record of the terminal user.

In the step 2303, the base station transmits the received location information of terminal to the core network. Furthermore, it may transmit the location information of terminal to another base station or receive the location information of the other terminal from the base station.

In the step 2305, the base station receives the content information to be stored in the terminal from the core network. The content information includes the information about the type of content, the capacity of the content, the storage time, and the number of segments. It may periodically transmit the traffic condition of the current cell to the core network.

In the step 2307, the base station transmits the content to the terminal based on the received content information. Prior to this, the core network may perform a process of determining whether the corresponding base station is overload. When it is determined that the corresponding base station is not overload, the step 2307 may be performed.

In the step 2309, the base station checks whether the terminal has entered the cell of the base station. The entry into a base station cell may mean a case in which the terminal enters an area capable of receiving the content-related data from the base station.

In the step 2311, after checking whether the terminal has entered the cell of the base station, the base station transmits the information on the entry state of terminal to the core network. The information on the entry state of terminal into the cell may be shared with other base stations through the core network. When it is confirmed that the terminal has not entered the cell, the base station returns to the step 2301 and receives the location information of the terminal again.

FIG. 24 is a flowchart illustrating an operation of the terminal in a wireless communication system according to various embodiments of this disclosure.

In the step 2401, the terminal transmits its location information to the base station. The location information of terminal includes the information about the mobility or movement pattern of terminal. Through this, it may predict the location of terminal in the future and, based on this, it may estimate when and where an overload cell occurs. It may determine the type of content to be stored and the storage time based on the estimated value of the overload cell, the preference of a specific content and the reproduction record of the terminal user.

In the step 2403, the terminal receives the content from the base station. Before receiving the content, the terminal may transmit a message requesting the information about the necessary content to the base station. Prior to this, the core network may perform a process of determining whether the corresponding base station is an overload cell. When the corresponding base station turned out not to be an overload cell, the step 2307 may be performed.

In the step 2405, the terminal stores the content received from the base station in its storage unit.

In the step 2407, the terminal itself checks whether it has entered the overload cell. The terminal may judge the entry by itself, or by receiving a signal regarding the entry from the base station.

In the step 2409, once it is confirmed to have entered the overload cell, the terminal may form a D2D communication link with another terminal in the cell. The D2D communication link may be formed by the terminal's own determination, or formed in response to permission or command from the base station or the core network. When the terminal turned out not to have entered the overload cell, the terminal returns to the step 2401 and performs a process of transmitting the location information of the terminal to the base station.

In the step 2411, once a D2D communication link is established, a plurality of terminals may transmit/receive the content to/from each other. In this case, a specific terminal may request a specific content and, if the specific content is included in the storage unit of an adjacent terminal belonging to the D2D communication link, the content may be delivered.

FIGS. 25A to 25F illustrate an distribution effect of the traffic load in space and time by the caching in a wireless communication system according to various embodiments of this disclosure.

The application conditions according to the common scenario of this invention are shown in the table below:
Common Scenario

| # of devices | Caching ratio n | Cell size | D2D distance | # of BS's | Mobility |
| --- | --- | --- | --- | --- | --- |
| n = 180 | M/m = 0.05 | $R_{cell}$ = 250 m | $R_{d2d}$ = 50 m | B = 10, 15 | Medium, low |

As shown in FIGS. 25A to 25F, it can be confirmed that, by applying this disclosure, the overload occurring in space and time in each cell can be lowered to a certain level.

FIG. 26 illustrates a usage ratio of access link load according to the size of storage unit in a wireless communication system according to various embodiments of this disclosure.

FIG. 26 shows that the load of the radio access link is reduced according to the size of the storage unit in the terminal and, if the capacity of the storage unit is large enough, the offloading effect goes up to 100% or higher by applying this invention. Furthermore, the gain due to steering can also be confirmed.

FIG. 27 illustrates a usage ratio of access link load according to the number of users in a wireless communication system according to various embodiments of this disclosure.

In FIG. 27, it can be seen that the performance improves as the number of terminals in the system increases, and that the performance improves by 50%~500% depending on the number of terminals and the size of the storage unit of the terminal.

FIG. 28 illustrates a usage ratio of access link load according to the mobility prediction variability of a terminal in a wireless communication system according to various embodiments of this disclosure In FIG. 28, the mobility dispersion factor δ is changed in order to observe the performance of terminals against the uncertainty of the mobility prediction. Here, the more accurate the mobility model is, the greater the performance is expected to improve up to about 200% compared to the conventional method. If the information is inaccurate, it tends to converge to the performance of the conventional method.

FIG. 29 illustrates a usage ratio of access link load according to different degrees of content preference of the terminal in a wireless communication system according to various embodiments of this disclosure.

In FIG. 29, it can be seen that, as the content preference of terminals is more different from each other (individuality gets closer to 1), the performance difference from the conventional method gets greater. Even if the preferences of all terminals are similar, it has a performance difference from the conventional method.

The methods according to the embodiments described in the claims or specifications of this disclosure may be implemented in the form of hardware, software, or a combination of hardware and software.

When it is implemented in software, a computer-readable storage medium storing one or more programs (software modules) may be provided. One or more programs stored in the computer-readable storage medium are configured for execution by one or more processors in an electronic device. One or more programs include the instructions for the electronic device to execute the methods according to embodiments described in the claims or specifications of this disclosure.

Such programs (software modules, software) may be stored in a random access memory (RAM), a non-volatile memory including flash memory, a read only memory (ROM), an electrically erasable programmable read only memory (EEPROM), a magnetic disc storage device, a compact disc-ROM (CD-ROM), a digital versatile disc (DVD) or other optical storage device, a magnetic cassette, or a memory composed of some or all thereof. In addition, each configuration memory may include plural units.

Furthermore, the programs can be transmitted into an attachable storage device accessible through a communication network such as Internet, an intranet, a local area network (LAN), a wide area network (WAN), a storage area network (SAN), or a combination thereof. Such a storage device may be connected to the device implementing an embodiment of this disclosure through an external port. In addition, a separate storage device on the communication network may be connected to the device implementing the embodiment of this disclosure.

In the above-mentioned specific embodiments of this disclosure, the components included in the disclosure are expressed in the singular or plural according to the specific embodiments presented. However, the singular or plural expression has been arbitrarily selected in the context for the convenience of description, and this disclosure is not limited to the singular or plural element. Even if an element is expressed in plural, it may be composed of singular unit; even an element expressed in singular may be composed of a plurality of components.

In addition, although specific embodiments have been described in the detailed description of this disclosure, various modifications are, of course, possible unless they are deviated from the scope of this disclosure. Therefore, the scope of this disclosure should not be limited to the described embodiments and should be defined by the claims below and their equivalents.

The invention claimed is:

1. A method for operating a base station in a wireless communication system comprising:
   a process of receiving a location information of a terminal;
   a process of transmitting the location information of the terminal to a core network;
   a process of receiving a content information to be stored in the terminal from the core network;
   a process of transmitting a content to the terminal according to the content information;
   a process of checking whether the terminal has entered a cell of the base station; and
   a process of transmitting a cell entry information of the terminal to the core network,
   wherein the method further comprises:
   a process of receiving a content storage status information of the terminal from the terminal;
   a process of analyzing a content storage discrepancy;
   a process of scheduling the content in response to the analyzing; and
   a process of transmitting the content to the terminal according to the scheduling.

2. The method of claim 1 comprising:
   a process of receiving a terminal identity information and a requested content information from the terminal;
   a process of receiving a content storage state information from the core network; and
   a process of scheduling a wireless resource to the terminal based on the content storage state information;
   wherein the terminal identity information comprises identity information of the terminal and at least one another terminal adjacent to the terminal; and
   wherein the requested content information comprises the content information requested by the terminal.

3. An apparatus with a base station in a wireless communication system comprising:
   a transceiver; and
   at least one base station processor connected to the transceiver,
   wherein the at least one base station processor:
   receives a location information of a terminal;
   transmits the location information of the terminal to a core network;
   receives a content information to be stored in the terminal from the core network;
   transmits a content to the terminal according to the content information;
   checks whether the terminal has entered a cell of the base station; and
   transmits a cell entry information of the terminal to the core network, and
   wherein the at least one base station processor:
   receives a content storage status information of the terminal from the terminal;
   analyzes a content storage discrepancy;
   schedules the content in response to the analyzing; and
   transmits the content to the terminal according to the scheduling.

4. The apparatus of claim 3,
   wherein the at least one base station processor:
   receives a terminal identity information and a requested content information from the terminal;
   receives a content storage state information from the core network; and
   schedules a wireless resource to the terminal based on the content storage state information,
   wherein the terminal identity information comprises:
   identity information of the terminal and at least one another terminal adjacent to the terminal, and
   wherein the requested content information comprises the content information requested by the terminal.

5. The apparatus of claim 3,
wherein the terminal comprises at least one terminal processor, and
wherein the at least one terminal processor:
transmits the location information of the terminal to the base station,
receives the content from the base station;
stores the received content;
checks whether the terminal has entered an overload cell;
forms a D2D communication link with another terminal in the cell in response to the terminal having entered the overload cell; and
transmits the content between the terminal and the another terminal through the D2D communication link.

6. The apparatus of claim 5,
wherein the at least one terminal processor:
periodically transmits the storage status information of the content transmitted through the D2D communication link to the base station;
receives a scheduling signal for the content to be stored from the base station; and
transmits the content to another terminal according to the scheduling signal.

7. The apparatus of claim 5,
wherein the at least one terminal processor:
receives information regarding the content storage state targeted by the base station from the base station; and
determines the content to be stored according to a target of the content storage state; and
stores the determined content.

8. The apparatus of claim 5,
wherein the terminal, which transmits the terminal identity information and the requested content information to the core network;
receives a scheduling signal from the base station; and
transmits the content to another terminal according to the scheduling signal.

9. An apparatus with a base station in a wireless communication system comprising:
a transceiver; and
at least one base station processor connected to the transceiver,
wherein the at least one base station processor:
receives a location information of a terminal;
transmits the location information of the terminal to a core network;
receives a content information to be stored in the terminal from the core network;
transmits a content to the terminal according to the content information;
checks whether the terminal has entered a cell of the base station; and
transmits a cell entry information of the terminal to the core network,
wherein the terminal comprises at least one terminal processor,
wherein the at least one terminal processor:
transmits the location information of the terminal to the base station,
receives the content from the base station;
stores the received content;
checks whether the terminal has entered an overload cell;
forms a D2D communication link with another terminal in the cell in response to the terminal having entered the overload cell; and
transmits the content between the terminal and the another terminal through the D2D communication link, and
wherein the at least one terminal processor:
periodically transmits the storage status information of the content transmitted through the D2D communication link to the base station;
receives a scheduling signal for the content to be stored from the base station; and
transmits the content to another terminal according to the scheduling signal.

10. The apparatus of claim 9,
wherein the at least one base station processor:
receives a terminal identity information and a requested content information from the terminal;
receives a content storage state information from the core network; and
schedules a wireless resource to the terminal based on the content storage state information,
wherein the terminal identity information comprises:
identity information of the terminal and at least one another terminal adjacent to the terminal, and
wherein the requested content information comprises the content information requested by the terminal.

11. The apparatus of claim 9,
wherein the at least one terminal processor:
receives information regarding the content storage state targeted by the base station from the base station; and
determines the content to be stored according to a target of the content storage state; and
stores the determined content.

12. The apparatus of claim 9,
wherein the terminal, which transmits the terminal identity information and the requested content information to the core network;
receives a scheduling signal from the base station; and
transmits the content to another terminal according to the scheduling signal.

* * * * *